(12) United States Patent
Shadowshot

(10) Patent No.: US 10,342,184 B2
(45) Date of Patent: Jul. 9, 2019

(54) PLANT SUPPORT SYSTEM AND METHOD OF USE

(71) Applicant: TCW Holdings, LLC, Carbondale, CO (US)

(72) Inventor: Cloud Nathan Shadowshot, Carbondale, CO (US)

(73) Assignee: TCW Holdings, LLC, Carbondale, CO (US)

( * ) Notice: Subject to any disclaimer, the term of this patent is extended or adjusted under 35 U.S.C. 154(b) by 290 days.

(21) Appl. No.: 15/133,731

(22) Filed: Apr. 20, 2016

(65) Prior Publication Data

US 2016/0302366 A1 Oct. 20, 2016

Related U.S. Application Data

(60) Provisional application No. 62/277,277, filed on Jan. 11, 2016, provisional application No. 62/150,016, filed on Apr. 20, 2015.

(51) Int. Cl.
*A01G 9/12* (2006.01)
(52) U.S. Cl.
CPC ............... *A01G 9/12* (2013.01); *A01G 9/128* (2013.01)
(58) Field of Classification Search
CPC .......... A01G 9/12; A01G 17/04; A01G 17/06; A01G 17/10; A01G 17/14
USPC ...................................... 47/70, 41.14, 42–47
See application file for complete search history.

(56) References Cited

U.S. PATENT DOCUMENTS

| | | | | |
|---|---|---|---|---|
| 44,447 A * | 9/1864 | O'Donnell | ............. | F16M 13/02 232/41 R |
| 649,665 A * | 5/1900 | Keller | ....................... | A47B 3/12 108/101 |
| 670,144 A * | 3/1901 | Bond | ..................... | F16M 11/00 126/30 |
| 699,066 A * | 4/1902 | Baskett | ................... | B63B 29/12 126/30 |
| 730,779 A * | 6/1903 | Lacy | ........................ | A01G 9/12 248/156 |
| 2,174,955 A * | 10/1939 | Wade | ..................... | A01G 9/128 47/47 |

(Continued)

FOREIGN PATENT DOCUMENTS

JP 2000083486 A 3/2000
JP 2004135526 A 5/2004

OTHER PUBLICATIONS

International Search Report and Written Opinion for PCT/US2016/028427, dated Jul. 29, 2016, 15 pages.

*Primary Examiner* — David J Parsley
*Assistant Examiner* — Danielle A Clerkley
(74) *Attorney, Agent, or Firm* — Hovey Williams LLP

(57) ABSTRACT

A plant support system is provided. The plant support system comprises a longitudinally-extending main support beam and at least one hub received on the main support beam. The plant support system additionally comprises at least one support arm that includes first and second ends, with the first end engaged with the hub, such that the support arm extends laterally from the hub. The plant support system further comprises a paddle engaged with the second end of the support arm, with the paddle comprising a frame enclosing an interior space, and with the paddle being configured to receive a portion of a plant through the interior space.

20 Claims, 14 Drawing Sheets

(56) References Cited

U.S. PATENT DOCUMENTS

| | | | | |
|---|---|---|---|---|
| 3,194,403 | A * | 7/1965 | Horn, Jr. | A47F 5/04 |
| | | | | 211/107 |
| 5,048,231 | A * | 9/1991 | Brown | A01G 9/12 |
| | | | | 47/45 |
| 6,595,377 | B1 * | 7/2003 | Hetu | A47F 7/0078 |
| | | | | 211/196 |
| 9,801,347 | B2 * | 10/2017 | Montagano | A01G 9/124 |
| 2005/0082244 | A1 | 4/2005 | Ho | |
| 2006/0042159 | A1 | 3/2006 | Lapelusa | |
| 2011/0308151 | A1 * | 12/2011 | Wu | A01G 9/12 |
| | | | | 47/46 |
| 2012/0073193 | A1 | 3/2012 | Duplantis | |
| 2014/0352209 | A1 * | 12/2014 | Huemer | A01G 9/12 |
| | | | | 47/44 |
| 2014/0353439 | A1 * | 12/2014 | Schilling | A47G 7/041 |
| | | | | 248/125.1 |
| 2017/0172073 | A1 * | 6/2017 | Van Den Heever | A01G 22/00 |

\* cited by examiner

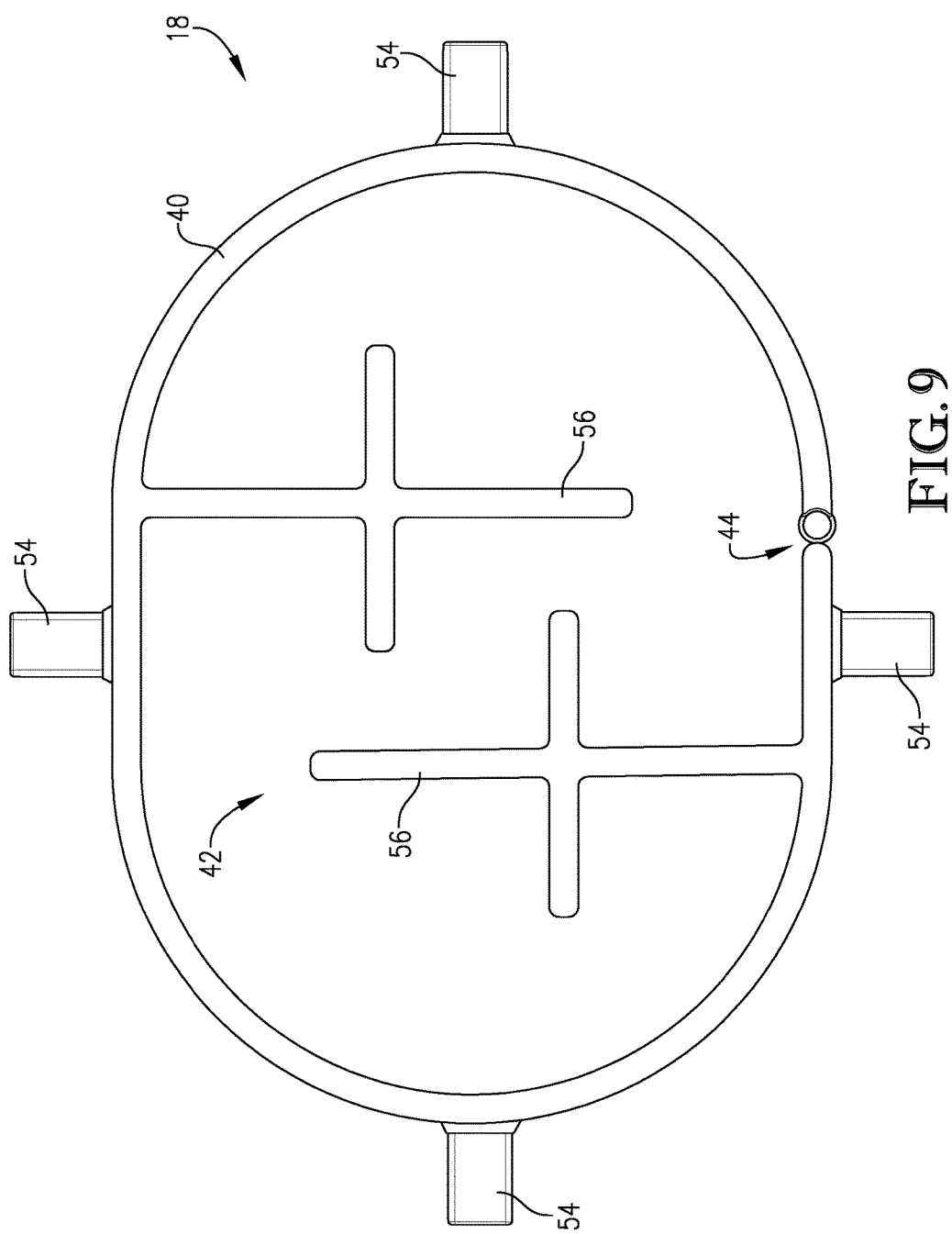

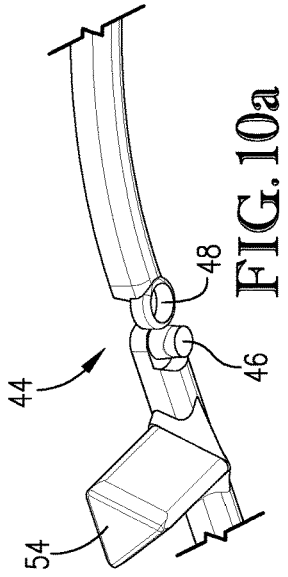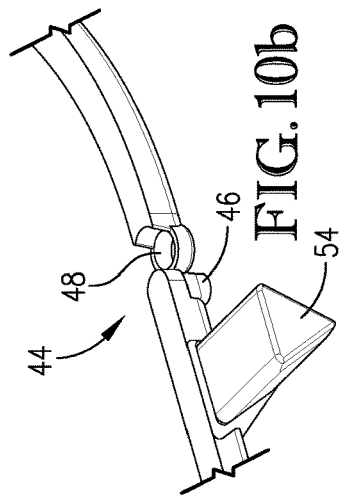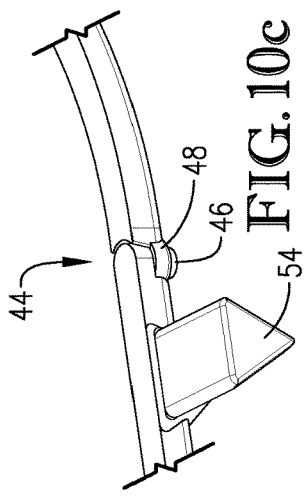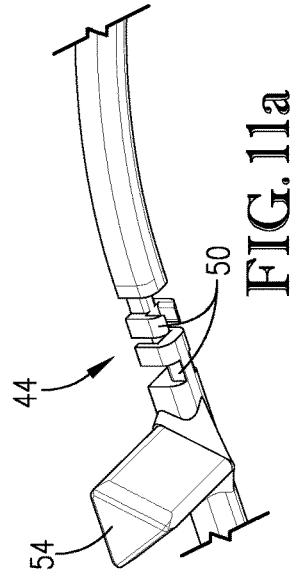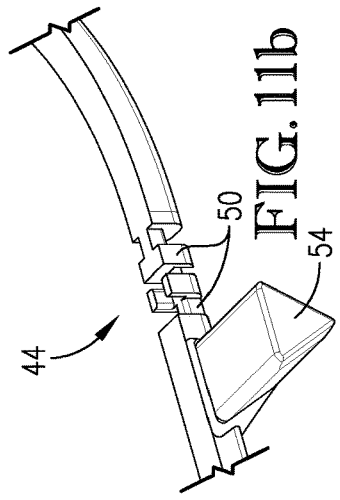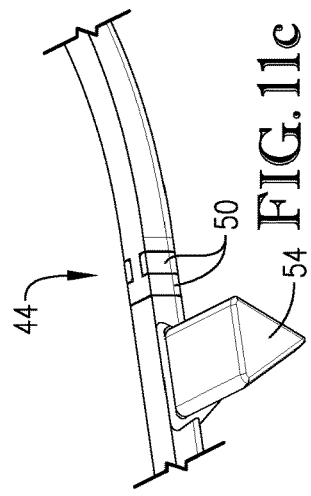

PLANT SUPPORT SYSTEM AND METHOD OF USE

CROSS-REFERENCE TO RELATED APPLICATION

This non-provisional patent application claims priority to U.S. Provisional Patent Application Ser. No. 62/150,016, filed on Apr. 20, 2015, entitled "THE LEAF TREE," and to U.S. Provisional Patent Application Ser. No. 62/277,277, filed on Jan. 11, 2016, entitled "THE LEAF TREE," the entirety of both provisional patent applications are hereby incorporated by reference into the present non-provisional patent application.

BACKGROUND OF THE INVENTION

1. Field of the Invention

Embodiments of the present invention are directed to a plant support system and a method of use. In more detail, embodiments of the present invention are directed a system and method for supporting a plant during the plant's progression through its growth cycle.

2. Description of the Related Art

Many types of plants are aided by supporting structures during their growth cycles. For example, many types of young trees (saplings) require the use of stakes and tethers to support the trees, so as to prevent extreme bending of the trees, which can damage or kill the trees. However, use of such common stake and tether-types supports can be cumbersome and time intensive, particularly as the stakes and tethers need to be repositioned as the trees grow.

Additionally, other types of plants require the use of support structures that allow the plants to expand (i.e., spread or branch-out) as they grow. For example, tomato plants generally required the assistance of a support structure to support the tomato plants as they grow vertically. In the past, simple trellis, truss, or cage-type structures have been used as support structures for tomato plants and other plants with similar requirements. Such support structures may also function to keep the tomato's fruit off of the ground. However, such support structures are generally formed from rudimentary designs, such that they do not provide the ability to customize their structure for a particular plant and/or according to an intended shape of the particular plant. As such, these previously-used support structures do not maximize the health benefits that can be obtained through use of an appropriate support structure. Furthermore, such support structures are generally large and unwieldy, which makes them difficult to transport, assemble/disassemble, and reposition for use with a plant.

As such, there exists a need for a plant support system that can be customized for a particular plant and/or for an intended shape and size of the plant. Additionally, there is a need for a support system that can be efficiently set up and adjusted. Specifically, there is a need for a support system that can be efficiently set up to sufficiently support a plant, while simultaneously providing for the ability to efficiently adjust the support system during the plant's growth cycle. Furthermore, there is a need for a support system that benefits the health of the plant by increasing exposure to sunlight and airflow, while reducing the chance of the plant experiencing rot, decay, and disease.

SUMMARY

Embodiments of the present invention include a plant support system that comprises a longitudinally-extending main support beam and at least one hub received on the main support beam. The plant support system additionally comprises at least one support arm that includes first and second ends, with the first end engaged with the hub, such that the support arm extends laterally from the hub. The plant support system further comprises a paddle engaged with the second end of the support arm, with the paddle comprising a frame enclosing an interior space, and with the paddle being configured to receive a portion of a plant through the interior space.

Embodiments of the present invention additionally a plant support system comprising a longitudinally-extending main support beam and at least one hub received on the main support beam. The plant support beam comprises at least one support arm extending laterally from the hub. The plant support beam further comprises a paddle engaged with the support arm, with the paddle including a frame enclosing an interior space and a webbing extending through a portion of said interior space. The paddle is configured to support branches of a plant via the frame and the webbing.

Embodiments of the present invention further include a method for assembling a plant support system to support a plant. The method may comprise the initial step of providing the plant support system that includes a longitudinally-extending main support beam, at least one hub configured to be received on the main support beam, at least one support arm configured to extend laterally from the hub, and a paddle configured to engage with the support arm, with the paddle comprising a frame enclosing an interior space. The method may additionally include the step of engaging the main support beam within a ground surface, such that the main support beam is orientated generally vertically. The method may additionally include the step of positioning the hub on the main support beam. The method may additionally include the step of engaging a first end of the support arm with the hub, such that the hub extends laterally from the support beam. The method may additionally include the step of engaging the paddle with a second end of the support arm. Upon engaging the paddle with the support arm, a portion of the plant is received within the interior space of the paddle such that the portion of the plant is supported by the paddle.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein:

FIG. 5b is a bottom perspective view of the hub from FIG. 5a;

FIG. 9 is a plan view of a paddle from the plant support system of FIG. 2;

FIG. 10a is a bottom partial view of the paddle from FIG. 9, particularly illustrating a connection mechanism in an open position, with the connection mechanism comprising a boss element and an aperture;

FIG. 10b is a top partial view of the connection mechanism from FIG. 10a;

FIG. 10c is a top partial view of the connection mechanism from FIGS. 10a and 10b, particularly illustrating the connection mechanism in a closed position;

FIG. 11a is a bottom partial view of a paddle according to embodiments of the present invention, particularly illustrating a connection mechanism in an open position, with the connection mechanism comprising tab and notch combination;

FIG. 11b is a top partial view of the connection mechanism from FIG. 11a;

FIG. 11c is a top partial view of the connection mechanism from FIGS. 11a and 11b, particularly illustrating the connection mechanism in a closed position;

Figure 1:
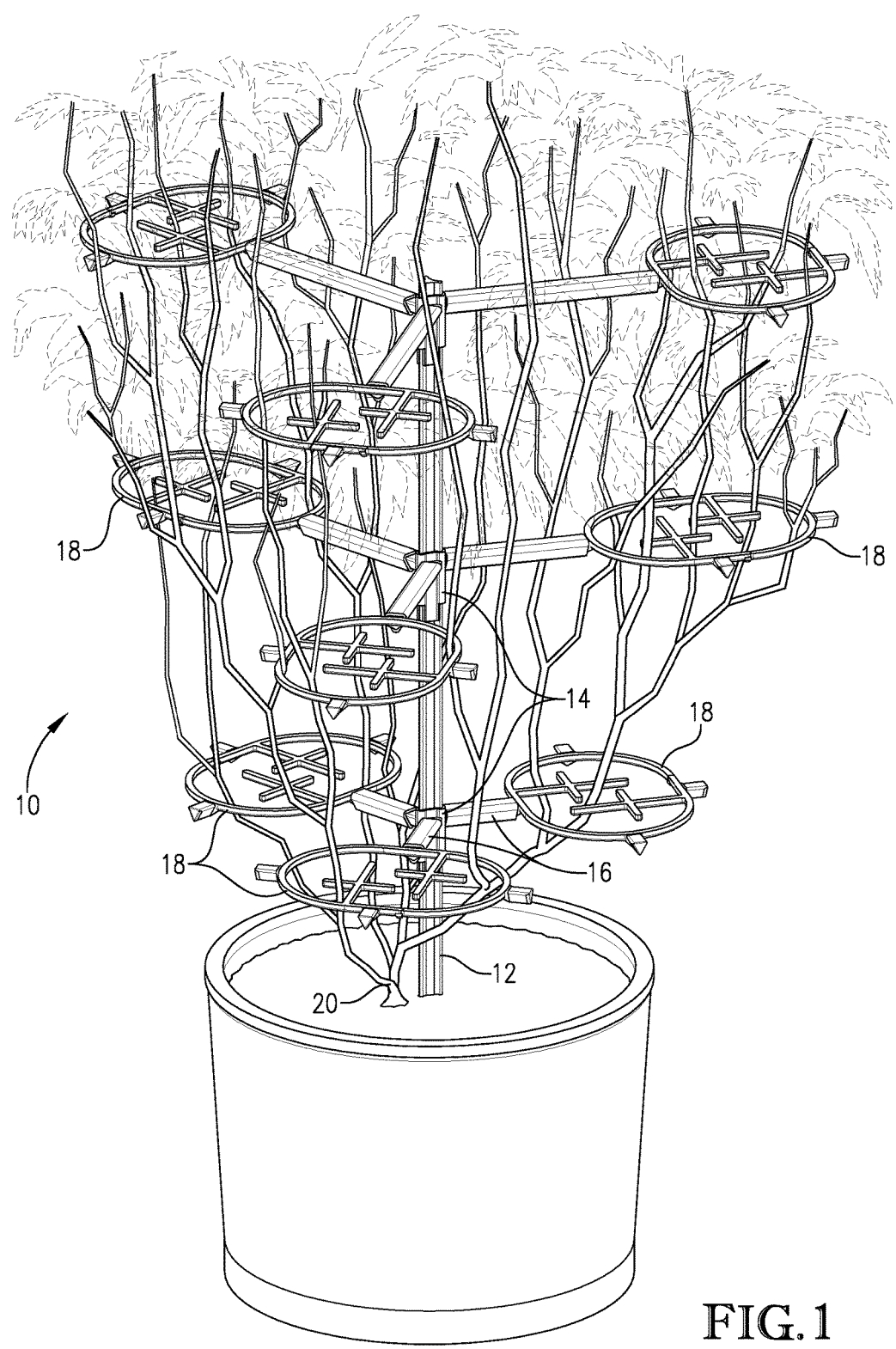
FIG. 1 is a perspective view of a plant support system of embodiments of the present invention being used to support a plant.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 2:
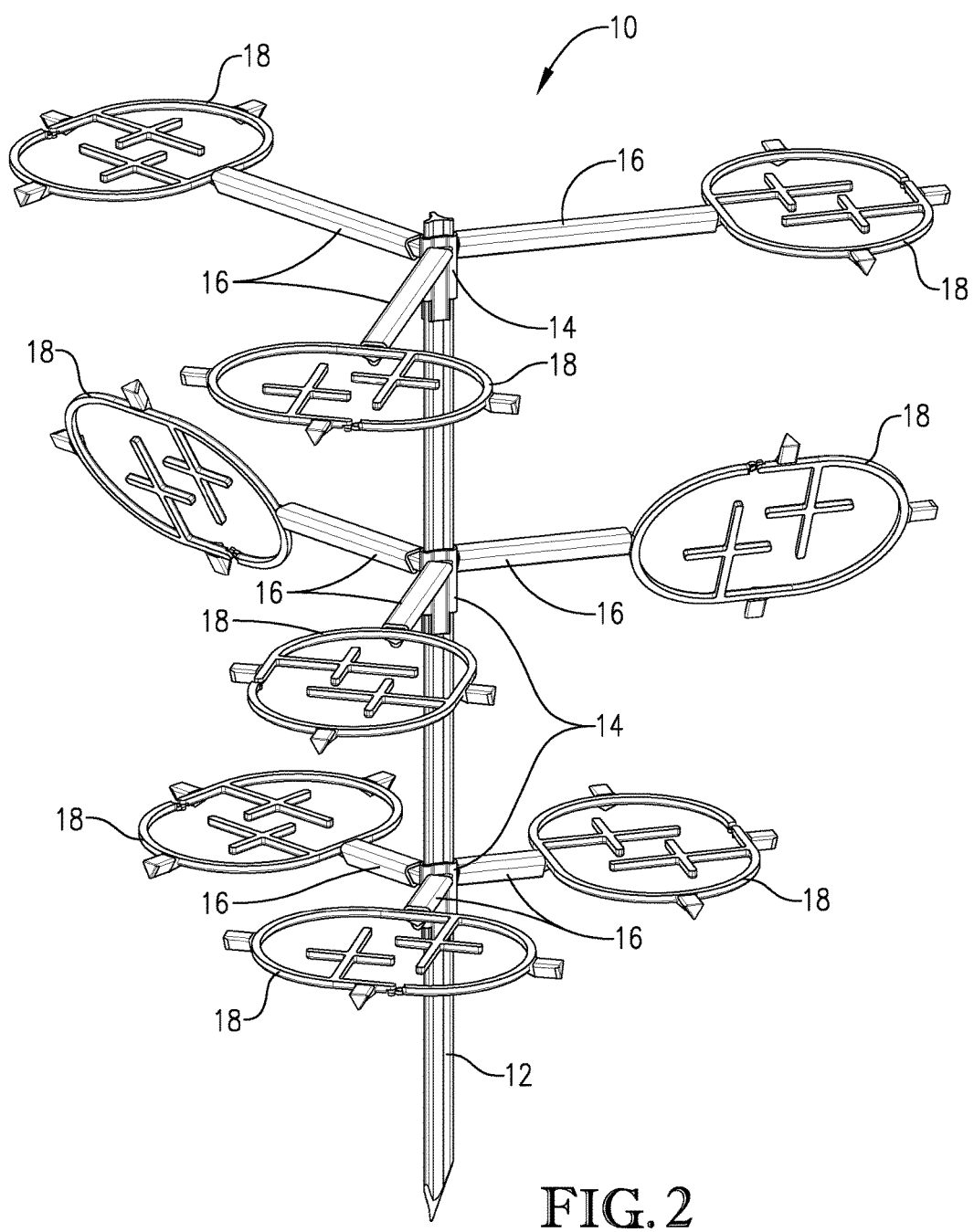
FIG. 2 is a perspective view of the plant support system of FIG. 1, particularly illustrating a main support beam, a plurality of hubs received on the main support beam, a plurality of support arms extending from each of the hubs, and a plurality of paddles engaged with the support arms, with the paddles being orientated in horizontal positions and in positions other than horizontal.

With reference to the drawings, and particularly with reference to FIGS. 1 and 2, embodiments of the present invention include a plant support system 10 for supporting a plant during its growth cycle. Broadly, the plant support system 10 may comprise a main longitudinally-extending support beam 12, one or more hubs 14 positioned about the main support beam 12, one or more support arms 16 that each include a first end connected to one of the hubs 14 and that extend in a lateral manner away from the hub 14 and/or from the main support beam 12, and one or more paddles 18 connected to a second end of each of the support arms 16. As such, the plant support system 10 of embodiments of the present invention can be used to physically support a plant as it grows during its growth cycle. Beneficially, each of the components of the plant support system 10 may be modular, such that the plant support system 10 is fully customizable. As such, the plant support system 10 can be configured as required to fit a particular plant or as required to guide a plant to grow towards a certain body shape, style, size, etc. Furthermore, because of the customizable nature of the plant support system 10, the plant support system 10 can be re-customized as the plant grows and as its body size and shape changes.

FIG. 1 provides an illustration of a plant support system 10 that has been configured specifically to fit a size and shape of a plant 20, such that the plant support system 10 adequately supports the plant 20. Specifically, the plant support system 10 includes the main support beam 12 that is secured in the ground (e.g., soil, potting material, etc.) and that extends generally vertically upward therefrom. The plant support system 10 additionally includes three hubs 14 positioned at increasing height levels about the main support beam 12, such that the plant support system 10 is configured to provide support to the plant 20 at multiple height levels. Furthermore, the support arms 16 of the plant support system 10 have varying lengths depending on their height level. For instance, the lowermost support arms 16 have a shortest length to support lower branches of the plant 20 that do not extend outward very far from a centerline of the plant 20. The uppermost support arms 16 have a longest length to support upper branches of the plant 20 that extend outward the farthest from the centerline of the plant 20. And the intermediate support arms 16 have a length between the uppermost and lowermost support arms 16. As such, the plant support system 10 may comprise an overall shape of an inverted pyramid to provide sufficient support to the plant 20 as the plant widens out (e.g., spreads or branches out) from bottom to top. Furthermore, because of the customizable nature of the plant support system 10, as the plant 20 continues to grow and change body shape, the components of the plant support system 10 can be changed and/or re-arranged to support the changes of plant 20.

Figure 3:
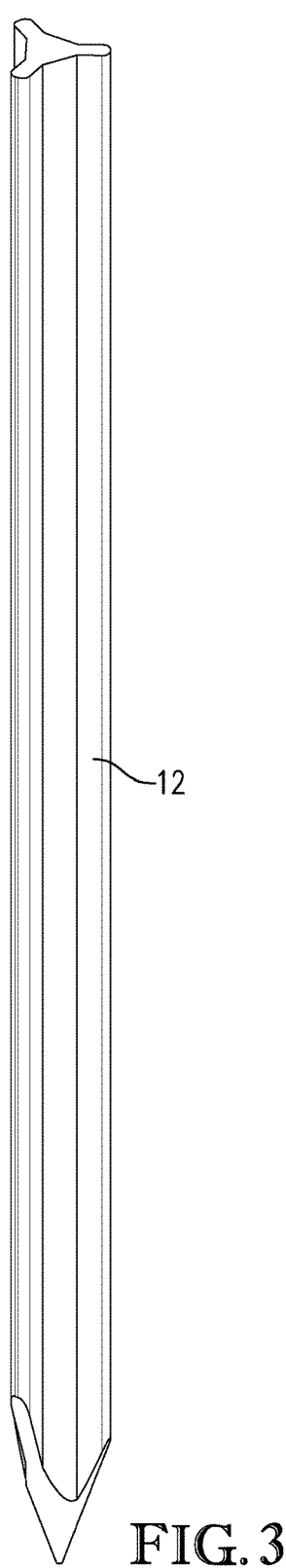
FIG. 3 is a perspective view of the main support beam from the plant support system of FIG. 2.

Turning to the components of the plant support system 10 in more detail, the main support beam 12 may comprise a longitudinally extending pole, shaft, bar, rod, or the like. The main support beam 12 may comprise various cross-sectional shapes, such as circular, square, triangular, cross-shaped, star-shaped, or the like. For instance, as shown in FIGS. 1-3, the main support beam 12 may have a generally triangular shape. In other embodiments, the main support beam 12 may have a generally circular cross-section and may also include a threaded outer surface. The main support beam 12 may be formed in various lengths, such as may be required to incorporate the plant support system 10 with a particular plant. For example, the main support beam 12 may have a length between 10 to 120 inches, between 15 to 100 inches, between 20 and 80 inches, between 25 and 60 inches, between 30 and 40 inches, or about 36 inches. In other embodiments, the main support beam 12 may be significantly longer, such as at least 10 feet, at least 20 feet, at least 50 feet, at least 100 feet, or more. In certain embodiments, as shown in FIG. 3, at least one end of the main support beam 12 may be formed with a point and/or sharpened portion, so as to facilitate insertion of the main support beam 12 into the ground.

Figure 4:
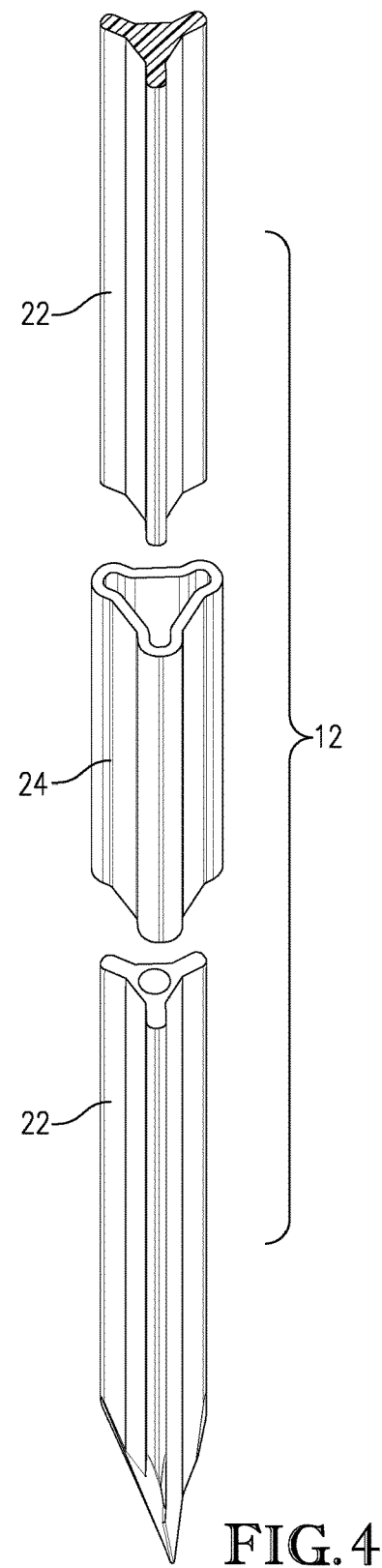
FIG. 4 is a perspective view of an additional embodiment of a main support beam, comprising a beam elements connected by an adapter element.

In some embodiments, the main support beam 12 may be formed as a solid, monolithic piece. However, in other embodiments, the main support beam 12 may be formed from a plurality of pieces connected together. For example, as shown in FIG. 4, the main support beam 12 may be formed from two or more beam elements 22 connected together by an adapter element 24. The adapter element 24 may be formed as a female connector comprising a hollow interior, with a cross-section shape of the hollow interior configured to accept and retain a portion of the beam elements 22. In some embodiments, the interior dimensions of the adapter element 24 may reduce towards its center, such that a beam elements 22 can be securely held within each end of the adapter element 24. As such, the main support beam 12 can be constructed generally of any required size by adding additional adapter elements 24 and beam elements 22 together.

The main support beam 12 may be formed from various types of materials, as may be necessitated by particular use requirements. In general, the material should be selected from a material with sufficient strength, flexibility, and durability to properly support an intended plant and to be used in the intended environment in which the plant is grown. For instance, in some embodiments, the main support beam 12 may be made from polymers, plastics, fiberglass, metals, woods, hemps, or other materials or combination thereof. In certain specific embodiments, the main support beam 12 may be formed from an anti-microbial polymer. For instance, the main support beam 12 may be formed from a polymer that includes an antimicrobial agent, which may also be anti-fungal, so as to inhibit the growth of microbes, bacteria, and fungi. The antimicrobial agent may comprise molecules directly embedded in the polymer, molecules incorporated in a solution and added to the polymer, or the like or combinations thereof. Depending on the growing environment, such embodiments may be preferable to the use of metal in the main support beam 12. As is generally known, certain metals have the potential to oxidize (i.e., rust), which can damage a plant by introducing too much iron into the plant's root system. In other embodiments, the main support beam 12 may be made from a material that provides anti-bacterial and/or anti-fungal properties. For example, the main support beam 12 may be formed from a polymer that is embedded with an anti-bacterial and/or anti-fungal substance. As a specific illustrative example, the main support beam 12 may be formed from propylene that is embedded with zinc pyrithione. Zinc pyrithione may be beneficial in certain embodiments because it includes both fungistatic properties (i.e., inhibits the division of fungal cells) and bacteriostatic properties (i.e., inhibits bacterial cell division). In other embodiments, the main support beam 12 may be formed from propylene that is embedded with copper pyrithione. In still other embodiments, the main support beam 12 may be formed from propylene that is embedded with a derivative of zinc pyrithione or copper pyrithione, or that is embedded with a combination of zinc pyrithione and copper pyrithione. The main support beam 12 may be formed by various manufacturing methods. However, in certain embodiments, such as when the main support beam 12 is formed from polymers, the main support beam 12 may be formed via an extrusion process or by 3-Dimensional (3D) printing.

Figure 5A:
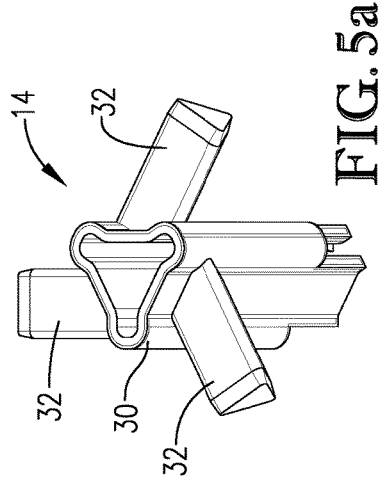
FIG. 5a is a top perspective view of a hub from the plant support system of FIG. 2.
Figure 5B:
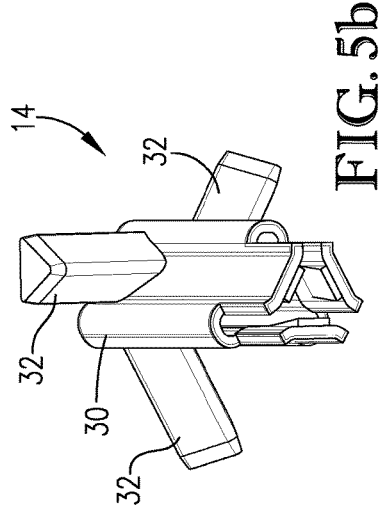

The hubs 14 of the plant support system 10 may be formed in various configurations. For example, as illustrated in FIGS. 1-2 and 5a-5b, the hubs 14 may comprise a main body 30 formed as a hollowed section of material, such that the hubs 14 are configured to act as female connectors. The hollowed interior portion of the hubs 14 may have a cross-section shape that corresponds with the cross-section shape of the main support beam 12, such that the hubs 14 may slindingly fit over the main support beam 12 for connection thereto. For example, as shown in FIGS. 5a-5b, the hubs 14 may be formed with a hollowed interior that is shaped (in cross-section) generally as a triangle, such that the hubs 14 may slidingly fit over the triangle-shaped (in cross-section) main support beam 12 illustrated in FIGS. 1-4. Alternatively, the hollowed interior of the hubs 14 may have other cross-section shapes, such as circular, square, triangular, cross-shaped, star-shaped, or the like. In some embodiments, it may be preferable for the hollow interior of the hubs 14 to have a non-circular cross-section, such that the hubs 14 are restricted from rotating about the main support beam 12.

The hubs 14 may be secured in place on the main support beam 12 by various methods of securement, such as by compression fittings, set-screws, tape, Velcro, magnets, rivets, buttons/snaps, adhesive, or the like. In some embodiments, such methods of securement provide for a releasable securement, such that the hubs 14 can be re-secured on the main support beam 12 at various positions. In some embodiments, such as is illustrated in FIG. 4, with the main support beam 12 comprising beam elements 22 connected together by an adapter element 24, the hub 14 may be slid over an upper beam element 22 until it engages the adapter element 24. In such embodiments, the hub 14 may be held in such a position due to its engagement with the adapter element 24. In further embodiments, such as in embodiments in which the main support beam 12 includes a threaded exterior, the interior of the hubs 14 may similarly be threaded, such that the hubs 14 can be secured onto the main support beam 12 by threading the hubs 14 onto the main support beam. Regardless of the method of securement, embodiments provide for a plurality of hubs 14 to be positioned at various height levels along the length of the main support beam 12.

Figure 5C:
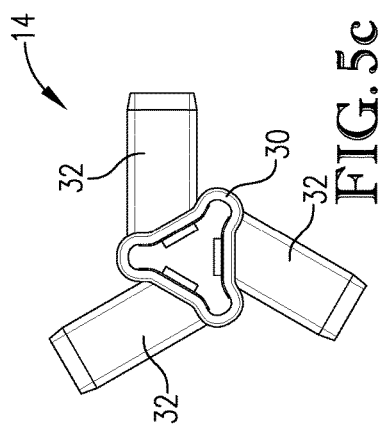
FIG. 5c is a bottom plan view of the hub from FIGS. 5a and 5b.

As illustrated in FIGS. 5a-5b, the hubs 14 may include one or more protrusions 32 extending laterally from the main body 30 of the hubs 14. Although FIGS. 5a-5c illustrate hubs 14 with three protrusions 32, the hubs 14 may be formed with various numbers of protrusions as may be required. For instance, the hubs 14 may include one, two, three, four, five, six, or more protrusions 32. The protrusions 32 may be formed in various sizes and shapes. For instance, FIGS. 5a-5b illustrate the protrusions 32 as being solid triangular cross-section pieces. However, the protrusions 32 could be generally any other cross-section shape, such as circular, square, cross-shaped, star-shaped, or the like. As will be described in more detail below, the protrusions 32 are generally configured to engage with the support arms 16, such that the support arms 16 are supported by the hubs 14. As such, the protrusions 32 may be formed as solid pieces, such that they can act as male connectors for mating with hollow support arms 16 that are formed as female connectors. Alternatively, however, the protrusions 32 may be formed as hollow pieces, such that they can act as female connectors for mating with solid support arms 16 formed as male connectors.

The hubs 14 may be formed from various types of materials, as may be necessitated by particular use requirements. In general, the material should be selected from a material with sufficient strength, flexibility, and durability to properly support an intended plant and to be used in the intended environment in which the plant is grown. For instance, in some embodiments, the hubs 14 may be made from polymers, plastics, fiber-glass, metals, woods, hemps, or other materials or combination thereof. In certain specific embodiments, the hubs 14 may be formed from an antimicrobial polymer. For instance, the hubs 14 may be formed from a polymer that includes an antimicrobial agent, which may also be anti-fungal, so as to inhibit the growth of microbes, bacteria, and fungi. The antimicrobial agent may comprise molecules directly embedded in the polymer, molecules incorporated in a solution and added to the polymer, or the like or combinations thereof. Depending on the growing environment, such embodiments may be preferable to the use of metal, which has the potential to oxidize (i.e., rust), thereby damaging the plant. In other embodiments, the hubs 14 may be made from a material that provides anti-bacterial and/or anti-fungal properties. For example, the hubs 14 may be formed from a polymer that is embedded with an anti-bacterial and/or anti-fungal substance. As a specific illustrative example, the hubs 14 may be formed from propylene that is embedded with zinc pyrithione. In other embodiments, the hubs 14 may be formed from propylene that is embedded with copper pyrithione. In still other embodiments, the hubs 14 may be formed from propylene that is embedded with a derivative of zinc pyrithione or copper pyrithione, or that is embedded with a combination of zinc pyrithione and copper pyrithione. The hubs 14 may be formed by various manufacturing methods. However, in certain embodiments, such as when the hubs 14 are formed from polymers and plastics, the hubs 14 may be formed via an extrusion process or by 3-Dimensional (3D) printing.

Figure 6:
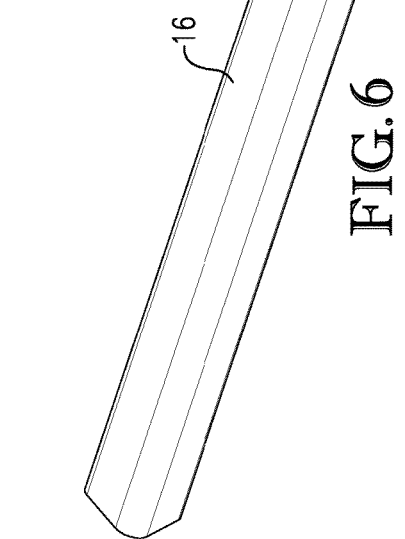
FIG. 6 is a perspective view of a support arm from the plant support system of FIG. 2, with the support arm having a longer length.
Figure 7:
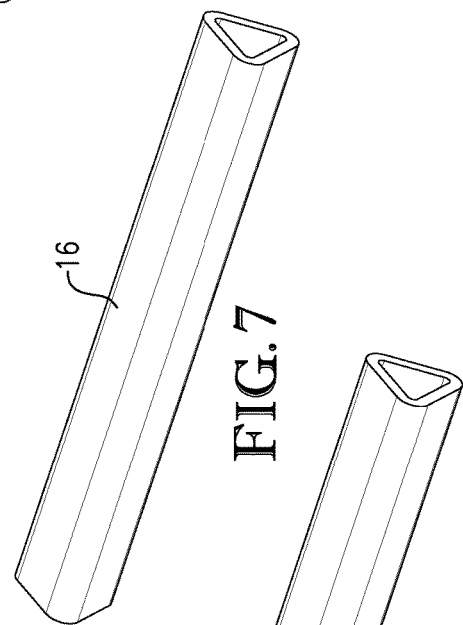
FIG. 7 is a perspective view of a support arm from the plant support system of FIG. 2, with the support arm having an intermediate length.
Figure 8:
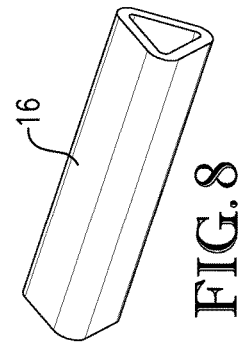
FIG. 8 is a perspective view of a support arm from the plant support system of FIG. 2, with the support arm having a shorter length.

The support arms 16 are generally comprised of extended poles, shafts, bars, rods, or the like. As shown in FIGS. 6-8, the support arms 16 may be hollow, such that they act as female connectors, which are configured to engage, at a first end, with the protrusions 32 of the hubs 14, particularly in embodiments in which the protrusions 32 are formed as solid pieces. Alternatively, the support arms 16 may be solid, such that they act as male connectors, which are configured to engage, at the first end, with the protrusions 32 of the hubs 14, particularly in embodiments in which the protrusions 32 are formed as hollow pieces. As will be described in more detail below, the second ends of the support arms 16 may be configured to engage and support the paddles 18. Because the support arms 16 are generally configured to engage with the protrusions 32 of the hubs 14, the support arms 16 may be formed in cross-sectional shapes that correspond to the cross-sectional shapes of the protrusions 32. For example, as shown in FIGS. 6-8, the support arms 16 may be formed with a triangular cross-sections, so as to engage with the triangular cross-section shaped protrusions 32 of the hubs 14 illustrated in FIGS. 5a-5c. However, the support arms 16 could alternatively be formed with generally any other cross-section shape, such as circular, square, cross-shaped, star-shaped, or the like. In some embodiments, it may be preferable for the support arms 16 to have non-circular cross-sections, such that the support arms 16 are restricted from rotating about the protrusions 32 of the hubs 14.

The support arms 16 may be formed in various lengths as may be required. For example, FIGS. 6-8 illustrate support arms 16 of different lengths. As previously described, and as illustrated in FIGS. 1-2 for example, certain embodiments of the plant support system 10 may provide for lower support arms 16 (i.e., located lower on the plant support system 10) to be shorter than upper support arms 16 (i.e., located higher on the plant support system 10). As such, the paddles 18 engaged with the support arms 16 (as described below) will be able to properly support a plant as the plant's width expands with increasing height. Nevertheless, in certain specific embodiments, the support arms 16 may have a length of about 2 inches, about 4 inches, about 6 inches, about 8 inches, about 10 inches, or about 12 inches. Alternatively, the support arms 16 may have a length between 2 and 22 inches, between 3 and 20 inches, between 4 and 20 inches, between 5 and 18 inches, between 6 and 16 inches, between 8 and 14 inches, or between 10 and 12 inches. Alternatively, the support arms 16 may have a length of at least 2 inches, at least 4 inches, at least 6 inches, at least 10 inches, at least 12 inches, at least 24 inches, at least 36 inches, at least 48 inches, at least 60 inches, or more.

The support arms 16 may be formed from various types of materials, as may be necessitated by particular use requirements. In general, the material should be selected from a material with sufficient strength, flexibility, and durability to properly support an intended plant and to be used in the intended environment in which the plant is grown. For instance, in some embodiments, the support arms 16 may be made from polymers, plastics, fiber-glass, metals, woods, hemps, or other materials or combination thereof. In alternative embodiments, the support arms 16 may be formed from wood, fiberglass, bamboo, aluminum, or the like. In certain specific embodiments, the support arms 16 may be formed from an anti-microbial polymer. For instance, the support arms 16 may be formed from a polymer that includes an antimicrobial agent, which may also be anti-fungal, so as to inhibit the growth of microbes, bacteria, and fungi. The antimicrobial agent may comprise molecules directly embedded in the polymer, molecules incorporated in a solution and added to the polymer, or the like or combinations thereof. Depending on the growing environment, such embodiments may be preferable to the use of metal, which has the potential to oxidize (i.e., rust), thereby damaging the plant. In other embodiments, the support arms 16 may be made from a material that provides anti-bacterial and/or anti-fungal properties. For example, the support arms 16 may be formed from a polymer that is embedded with an anti-bacterial and/or anti-fungal substance. As a specific illustrative example, the support arms 16 may be formed from propylene that is embedded with zinc pyrithione. In other embodiments, the support arms 16 may be formed from propylene that is embedded with copper pyrithione. In still other embodiments, the support arms 16 may be formed from propylene that is embedded with a derivative of zinc pyrithione or copper pyrithione, or that is embedded with a combination of zinc pyrithione and copper pyrithione. The support arms 16 may be formed by various manufacturing methods. However, in certain embodiments, such as when the support arms 16 are formed from polymers and plastics, the support arms 16 may be formed via an extrusion process or by 3-Dimensional (3D) printing.

With reference to FIG. 9, the paddles 18 may be comprised of a frame 40 forming a perimeter and a webbing 42 extending from the frame 40 within an interior space defined by the frame 40. In some embodiments, the frame 40 will form a closed shape, such as a circle, an oval, or the like. However, the frame 40 can be formed as other shapes, such as rectangles, squares, and the like. In certain embodiments, the frame 40 will be formed as a continuous piece of material. Alternatively, the frame 40 may be formed as a one or more discontinuous pieces of material, such that the frame 40 can be selectively released from a closed position (i.e., a closed shape) to an open position (i.e., an open shape) and/or connected from an open position (i.e., an open shape) to closed position (i.e., a closed shape). In more detail, the frame 40 may include a connection mechanism 44 that releasably connects ends of the frame 40 together to selectively provide for the paddle 18 to be in a closed position or an open position. For instance, as shown in FIGS. 10*a*-10*c*, the connection mechanism 44 may comprise a boss element 46 configured to releasingly engage with an aperture 48. As such, with the boss element 46 engaged with the aperture 48, as shown in FIGS. 9 and 10*c*, the connection mechanism 44 is closed such that the frame 40 of the paddle 18 is in a closed position (e.g., closed shaped oval of FIG. 9). Alternatively, with the boss element 46 disengaged from the aperture 48, as shown in FIGS. 10*a* and 10*b*, the connection mechanism 44 is open such that the frame 40 of the paddle 18 is in an open position (i.e., presents an open shape). In addition to the boss element 46 and the aperture 48, embodiments of the present invention may include other types of connection mechanisms 44, such as the tab and notch combination 50 illustrated by FIGS. 11*a*-11*c*. In such embodiments, each free end of the frame 40 may include tabs and notches configured to engage with notches and tabs, respectively, on a corresponding other free end of the frame 40. As such, the connection mechanism 44 facilitates the ability of the paddle 18 to be selectively released from a closed position (i.e., a closed shape) to an open position (i.e., an open shape) and/or connected from an open position (i.e., an open shape) to closed position (i.e., a closed shape). As will be described in more detail below, the ability of the paddles 18 to be selectively transitioned from a closed position to an open position (and vice-versa) facilitates the ability of the paddles 18 to be added or removed from the plant support system 10 when the plant support system 10 is being used to support a plant.

As shown in FIGS. 9-11*c*, embodiments of the present invention provide for the frames 40 of the paddles 18 to additionally include one or more protrusions 54 extending exteriorly from the frames 40. In some embodiments, the paddles 18 may include on a single protrusion 54. However, in other embodiments, the paddles 18 may include two, three, four, five, six, or more protrusions 54. For example, the paddle 18 illustrated in FIG. 9 includes four protrusions 54. As illustrated in FIGS. 9-11*c*, the protrusions 54 may be solid, such that they act as male connectors, which are configured to engage with the second ends of the support arms 16, particularly in embodiments in which the support arms 16 are formed as hollow pieces. Alternatively, the protrusions 54 may be hollow, such that they act as female connectors, which are configured to engage with the second ends of the support arms 16, particularly in embodiments in which the support arms 16 are formed as solid pieces. Because the protrusions 54 are generally configured to engage with the support arms 16, the protrusions 54 may be formed to include cross-section shapes that correspond to the cross section shapes of the support arms 16. For example, as shown in FIGS. 9-11*c*, the protrusions 54 may be formed with triangular cross-sections, which correspond with the triangular cross-sections of the support arms 16 illustrated in FIGS. 6-8. However, the protrusions 54 could be formed with generally any other cross-section shape, such as circular, square, cross-shaped, star-shaped, or the like. In some embodiments, it may be preferable for the protrusions 54 to have non-circular cross-sections, such that the protrusions 54 are restricted from rotating about the support arms 16.

In some embodiments, the paddles 18 may also include the webbing 42 that extends about an interior space defined by the frames 40 of the paddles 18. Specifically, the webbing 42 may comprise one or more extension elements 56 that extend from the frame 40 perimeter inwardly through the interior space of the paddles 18. In some embodiments, the extension elements 56 may be simple linear or curved elements. However, in other embodiments, the extension elements 56 may have more complex shapes, such as the cross-shaped extension elements 56 illustrated in FIG. 9. In addition, in some embodiments, the extension elements 56 may extend from the frame 40 and may not re-connect with the frame 40, such that the webbing 42 does not form closed shapes within the interior space of the paddle 18. For example, the cross-shaped extension elements 56 illustrated in FIG. 9 extend from the frame 40 but do not re-connect with the frame, such that the extension elements 56 (in conjunction with the frame 40) do not form closed shapes within the paddle 18. As will be described in more detail below, the ability of the webbing 42 not to form closed shapes may facilitate the ability of the paddles 18 to be integrated with a plant being supported by the plant support system 10. Nevertheless, in other embodiments (such as are described in more detail below), the extension elements 56 may extend from the frame 40 and re-connect with the frame 40 and/or intersect with other extension elements 56, so as to form closed shapes within the interior space of the paddle 18. For instance, the webbing 42 may be formed as a one or more circles, ovals squares, triangles, rectangles, or the like, within the interior space of the paddle 18.

The paddles 18 may be formed from various types of materials, as may be necessitated by particular use requirements. In general, the material should be selected from a material with sufficient strength, flexibility, and durability to properly support an intended plant and to be used in the intended environment in which the plant is grown. For instance, in some embodiments, the paddles 18 may be made from polymer, plastics, fiber-glass, metals, woods, hemps, or other materials or combination thereof. In alternative embodiments, the paddles 18 may be formed from wood, fiberglass, bamboo, aluminum, or the like. In certain specific embodiments, the paddles 18 may be formed from an anti-microbial polymer. For instance, the paddles 18 may be formed from a polymer that includes an antimicrobial agent, which may also be anti-fungal, so as to inhibit the growth of microbes, bacteria, and fungi. The antimicrobial agent may comprise molecules directly embedded in the polymer, molecules incorporated in a solution and added to the polymer, or the like or combinations thereof. Depending on the growing environment, such embodiments may be preferable to the use of metal, which has the potential to oxidize (i.e., rust), thereby damaging the plant. In other embodiments, the paddles 18 may be made from a material that provides anti-bacterial and/or anti-fungal properties. For example, the paddles 18 may be formed from a polymer that is embedded with an anti-bacterial and/or anti-fungal substance. As a specific illustrative example, the paddles 18 may be formed from propylene that is embedded with zinc pyrithione. In other embodiments, the paddles 18 may be formed from propylene that is embedded with copper pyrithione. In still other embodiments, the paddles 18 may be formed from propylene that is embedded with a derivative of zinc pyrithione or copper pyrithione, or that is embedded with a combination of zinc pyrithione and copper pyrithione. The paddles 18 may be formed by various manufacturing methods. However, in certain embodiments, such as when the paddles 18 are formed from polymers and plastics, the paddles 18 may be formed via an extrusion process or by 3-Dimensional (3D) printing.

In use, the plant support system 10 of embodiments of the present invention can be used to physically support a plant in the plant's current physical state and as the plant grows during its growth cycle. Specifically, the plant support system 10 is configured to support the vertical rise, width-expansion and spreading (branching-out) of a plant as it grows during its natural body cycle. As such, the plant support system 10 can support a plant in its vertical and width-expandable growth so as to promote the generation of fan leaves, finger (blade) extensions, internodes, side branches, stem support, and skin stretch, each of which may result in an increase in plant size, health, and yield. Specifically, the physical support provided by the plant support system 10 allows the plant to otherwise put its energy into maintaining natural growth, vitality, health and increased production yields.

In some embodiments, the plant support system 10 may be assembled and installed in the ground before the plant begins to grow from the ground. As such, the plant support system 10 allows the plant to be supported when it starts to increase in size and weight, thereby providing for encouraged development in the plant's vertical rise, width-expansion, branching or spreading-out, stem growth, bearing of its buds, leaves, fingers (blades), fruits or flowers, and the like.

Furthermore, such a pre-positioning of the plant support system 10 may be beneficial in that in addition to providing support for the plant as it grows, the plant support system 10 is capable of guiding the plant during its growth cycle. As a result, the user of the plant support system 10 can direct the manner in which the plant grows. For example, the user can guide the size and shape of the plant by positioning the paddles 18 at particular locations. As such, portions of the plant (e.g., branches, stems, or the like) can be guided, via the paddles 18, towards a particular shape in which the user intends for the plant to grow.

In other embodiments, as will be described in more detail below, the plant support system 10 can be integrated with a plant that has already begun to grow from the ground. In more detail, and with reference to FIG. 1, the main support beam 12 can be inserted into the ground. In certain embodiments, main support beam 12 may be inserted such that it extends generally vertically from the ground and such the main support beam 12 is orientated generally adjacent to a longitudinal centerline of the plant. The length of the main support beam 12 may be chosen to correspond with the present height of the plant 20, with the final, intended height of the plant 20, or with an intermediate height of the plant. As previously mentioned, in some embodiments, the main support beam 12 may include multiple beam elements 22 connected together via adapter elements 24. In such embodiments, a sufficient number of multiple beam elements 22 may be connected together via adapter elements 22 so that the main support beam 12 extends to a particular, intended height.

Next, one or more hubs 14 can be secured to the main support beam 12 at various locations along the height of the main support beam 12. The number of hubs 14 may vary depending on the current or intended height of the plant 20. As previously described, each hub 14 is capable of supporting one or more support arms 16 and paddles 18, which in turn, support portions of the plant. As such, the inclusions of more hubs 14 in the plant support system 10 allows for increased ability to support the plant 20 about the plant's height. For example, as shown in FIG. 1, the plant support system 10 may include three hubs 14, comprising a lower hub 14, an intermediate hub 14, and upper hub 14. As such, with the support arms 16 and paddles 18 extending from each of the hubs 14, the plant support system 10 can provide sufficient support to the plant 20 at lower portions of the plant 20, intermediate portions of the plant 20, and upper portions of the plant 20.

After the hubs 14 have been positioned on the main support beam 12, the support arms 16 can be engaged with the protrusions 32 of the hubs 14, such that the support arms 16 extend generally laterally from the main support beam 12. In some embodiments, the support arms 16 may extend generally perpendicularly with respect to the main support beam 12; however, in other embodiments, the support arms 16 may extend at other angles with respect to the main support beam 12. The support arms 16 may be selected of specific lengths so as to be capable of positioning the paddles 18 at appropriate locations to support the plant 20. For instance, with reference to FIG. 1, the support arms 16 engaged with the lower hub 14 may have a relatively short length, as such support arms 16 are not required to position their associated paddles 18 very far out from the main support beam 12 because the branches at the bottom of the plant 20 do not extend very far out from the centerline of the plant 20. Contrastingly, the support arms 16 engaged with the upper hub 14 may have a relatively longer length, as such support arms 16 are required to position their associated paddles 18 relatively far out from the main support beam 12 because the branches at the top of the plant extend relatively far out from the centerline of the plant 20.

Finally, once the support arms 16 have been integrated with the plant support system 10, the paddles 18 can be engaged with each of the second ends (i.e., free ends) of the support arms 16. The paddles 18 should be positioned such that they provide support for the branches of the plant 20. Specifically, the branches can be directed through an interior space of the frame 40, such that the branches are positioned in contact with and supported by portions of the frame 40 and/or by the webbing 42, as is illustrated in FIG. 1. In some embodiments, the paddles 18 may be orientated in a substantially horizontal position, as shown in FIG. 1. However, in some embodiments, the paddles 18 may be configured to be orientated in a plurality of angular positions. For instance, FIG. 2 illustrates that one or more of the paddles 18 may be orientated in a position other that horizontal, such as a vertical position or a position between horizontal and vertical. In some embodiments, the ability of the paddles 18 to be orientated at various angular positions may be based on the shapes of the protrusions 54 and of the support arms 16. For example, in embodiments in which the cross-sectional shapes of the protrusions 54 and the support arms 16 are triangular, the paddles 18 may be orientated at three different angular positions. Similarly, in embodiments in which the cross-sectional shapes of the protrusions 54 and of the support arms 16 are cross shaped, the paddles 18 may be orientated at four different angular positions. Contrastingly, in embodiments in which the cross-sectional shapes of the protrusions 54 and of the support arms 16 are circular, the paddles 18 may be orientated at generally any required angular position. As such, embodiments of the present invention provide the ability of the paddles 18 to be orientated at a plurality of angular positions.

Beneficially, in embodiments in which the frame 40 includes a connection mechanism 44 (e.g., FIG. 1), the frame 40 can be opened so as to facilitate the ability of the branches to be positioned within the interior space of the paddle 18. Similarly, embodiments in which the webbing 42 does not form closed shapes within the frame 40 (e.g., FIG. 1) further facilitate the ability of the branches to be positioned within the interior space of the paddle 18. Specifically, if the frame 40 is not permitted to open and/or if the webbing 42 forms closed surfaces, the branches of the plant 20 may require to be weaved or threaded through the paddle 18 to permit the paddle 18 to be engaged with the support arms 16 in the manner shown in FIG. 1. Contrastingly, with the frame 40 opened and with the webbing 42 not forming closed shapes, the paddles 18 can be engaged with the support arms 16 and the frame 40 can be closed around the branches without necessitating the branches to be weaved or threaded through the interior space of the paddles 18.

The vertical and lateral position of the paddles 18 are generally dependent on the position of the hubs 14 and the length of the associated support arms 16. For example, with reference to the plant support system 10 illustrated in FIG. 1, the lower paddles 18 are positioned relatively near the main support beam 12, while the upper paddles 18 are positioned further from the support beam 12. Such a configuration allows the paddles 18 to appropriately support the branches of the plant 20 according the plant's body shape. Specifically, the lower paddles 18 support the lower portions of the plant's 20 branches, which do not extend very far out from the plant's 20 centerline, while the upper paddles 18 support the upper portions of the plant's 20 branches, which extend further out from the plant's 20 centerline. As such, the plant support system 10 may comprise an overall shape of an inverted pyramid to support the plant 20 as it widens out from bottom to top.

Figure 12:
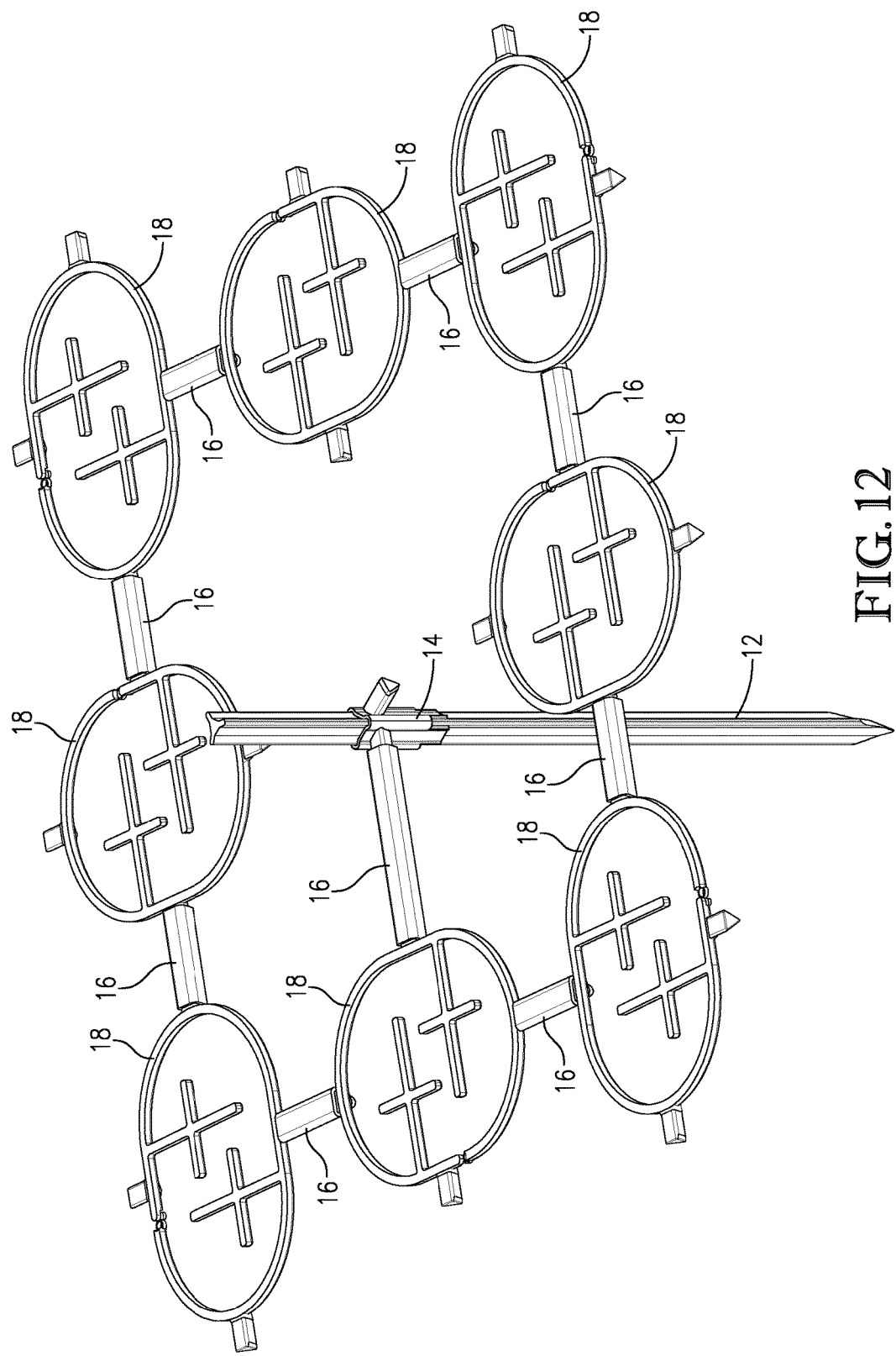
FIG. 12 is a perspective view of a plant support system according to embodiments of the present invention, particularly showing a plurality of paddles interconnected and being supported by a single hub received on a main support member.

Furthermore, because of the modular nature of the components of the plant support system 10, as plant 20 continues to grow and change body shape, the components of the plant support system 10 can be changed and/or re-arranged to support the changed plant 20. For example, the positions of the hubs 14, support arms 16, and paddles 18 can each be adjusted with respect to the main support beam 12. Similarly, if the plant 20 grows taller and/or wider, the main support beam 12 may be extended higher (e.g., by adding an additional beam element 22 and adapter element 24) or a longer main support beam 12 may be incorporated. Similarly, an additional hub 14, support arms 16, and paddles 18 may be added above the original hubs 14, support arms 16, and paddles 18. Furthermore, if necessary, the original support arms 16 may be replaced to permit the paddles 18 to extend further away from the main support beam 12. In addition to allowing for the re-arrangement of the plant support system 10, the modular nature of the plant support system 10 allows for various configurations of the hubs 14, support arms 16, and paddles 18 to be assembled. For example, FIG. 12 illustrates a unique configuration of multiple paddles 18 interconnected via a plurality of support arms 16 extending between protrusions 54 extending from the frames 40 of the paddles 18. However, it is noted that such a configuration of paddles 18 is supported on the main support beam 12 via a single hub 14 and a single support arm 16 extending from the single hub 14.

Embodiments of the present invention permit users to customize the position of the components of the plant support system 10 vertically and horizontally around the plant. As described above, to support a plant's growth, the lowermost level of hub 14, support arms 16, and paddles 18 may be positioned adjacent to the lower portions of the plant, such that they serve as a base support for which to allow the spreading or branching out of the plant. The next level (i.e., intermediate level) of hub 14, support arms 16, and paddles 18 provides for the user to be able to spread the plant out in its natural growth process to allow the interior portions of the plant (e.g., portions close to the plant's centerline) to receive airflow and light and to promote vertical expansion and width expansion of the plant. The uppermost level of hub 14, support arms 16, and paddles 18 provides for the user to be able to spread the plant out even further in its natural growth process to allow more airflow and light through to the interior portions of the plant, thereby promoting the vertical expansion and width expansion of the plant so as to increase product growth of additional buds, leaves, fruits or flower sites and the like. Such a layering process (i.e., repeated layers of hub 14, support arms 16, and paddles 18) may be repeated as many times as the user chooses to achieve a desired plant body shape result. As such, embodiments of the present invention facilitate the ability to guide the plant's growth, such as by directing the plant to extend vertically upward and to widen out (e.g., spread, branch, or bush out) in multiple directions, while simultaneously providing support and stability to the plant. Furthermore, the ability to orient the paddles 18 in a plurality of angular positions allows the plant support system 10 to be used with various types of plants. For instance, for tomato plants, the paddles 18 may be orientated substantially horizontal so as to support the branches and the fruit of the tomato plants. Alternatively, for grape plants (or other vines), the paddles 18 may be orientated substantially vertical so as to support the vines and the fruit of the plants.

In addition to providing a user the ability to guide a plant's growth, embodiments of the present invention may also be used to improve the overall health and harvest production of a plant. As described above, embodiments of the present invention provide a plant support system 10 that includes individual components that can be arranged in an adjustable manner so as to permit a user to customize the plant support system 10 as required for use with a particular plant.

In view of the above, embodiments of the present invention will provide for plants to experience greater health and higher yield productions because the plant is structurally supported by the plant support system 10. In more detail, by supporting a plant with the plant support system 10, the plant can use more of its energy for producing an increased yield of bud(s), leaves, fruit(s), flower(s), and the like. The plant support system 10 reduces the stress on the plant by at least partially supporting its height, weight and girth, which allows the plant to have a stronger stock (i.e., trunk), branches (i.e., stems), leaves, fingers (i.e., blades) and the like. For example, when using the plant support system 10 with a tomato plant, the tomato plant's fruit (i.e., tomatoes) can be prevented from drooping over or being weighed down, causing the tomato plant to lose its fruit, or otherwise rot by touching the ground. However, it should be understood that such an example is simply illustrative, and the plant support system 10 can be used for any type of plant that bears bud(s), leaves, fruit(s), flower(s), and the like.

In addition, by using the paddles 18 of the plant support system 10 to provide support to a plant by aiding the plant's natural growth in widening, spreading, and/or bushing-out, the plant support system 10 allows for more light and airflow towards a centerline of the plant, thereby encouraging more plant growth in the plant's interior areas. As such, the embodiments of the present invention promote the development of fruit(s), bud(s) or flowering sites on the plant, thereby increasing the overall yield of the plant. Furthermore, by promoting the ability of the plant to extend vertically upward and to widen, spread, or bush-out, the plant support system 10 allows for more airflow into and through the plant, thereby increasing healthier development by reducing the chance of the plant incurring mildew or fungus situations that often result in the loss of the plant to infection and rot that has the potential of spreading throughout crop of plants. Furthermore still, by forming the plant support system 10 with material with anti-bacterial and/or anti-fungal properties, the plant can undergo healthier development by reducing the chance of the plant incurring problematic bacterial or fungus situations of which often result in the loss of the plant to infection and rot that has the potential of spreading throughout the crop.

In addition to the above benefits, use of the plant support system 10 can reduce the physical labor costs and time and effort for a user. Specifically, the structure of the plant support system 10 allows the plant to weave itself up and through the paddles 18 independently as the plant grows. As such, user can spend much less time and effort than is generally required by individually staking and tethering each portion of a plant, as is required by previously-used staking and tethering-type supports. Thus, the plant support system 10 provides for less stress on a plant by allowing less physical handling, which results in both a stronger and healthier plant. Furthermore, the plant support system 10 provides for manicuring or pruning of the plant to be performed more efficiently by allowing the user to have easier access to the interior portions of the plant without exposing the plant to damage or bruising its bud(s), leaves, fingers (blades), fruit(s) or flower(s), such as may result from over-handling or contaminating the plant(s).

Figure 13:
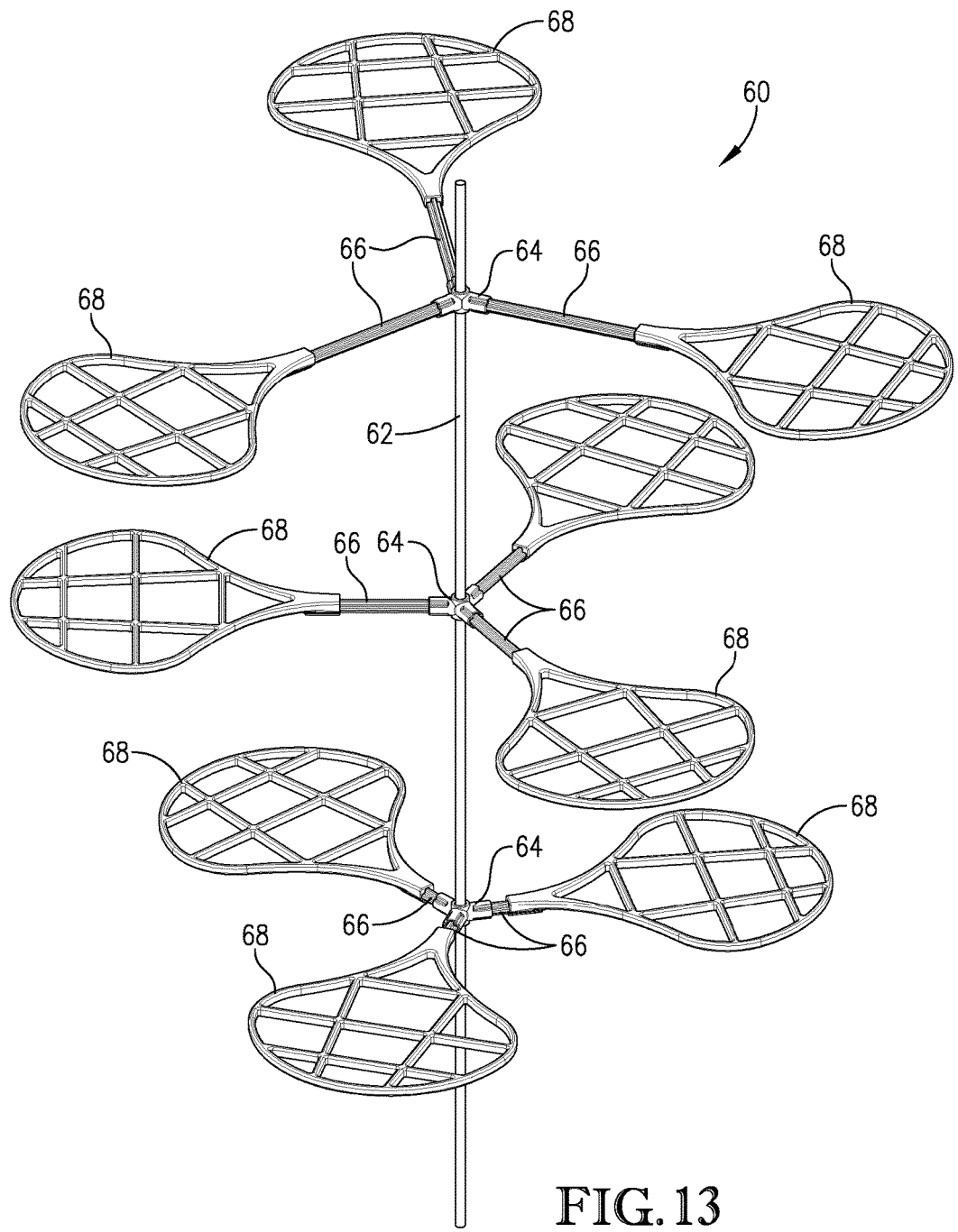
FIG. 13 is a perspective view of an additional embodiment of a plant support system according to embodiments of the present invention.
Figure 14:
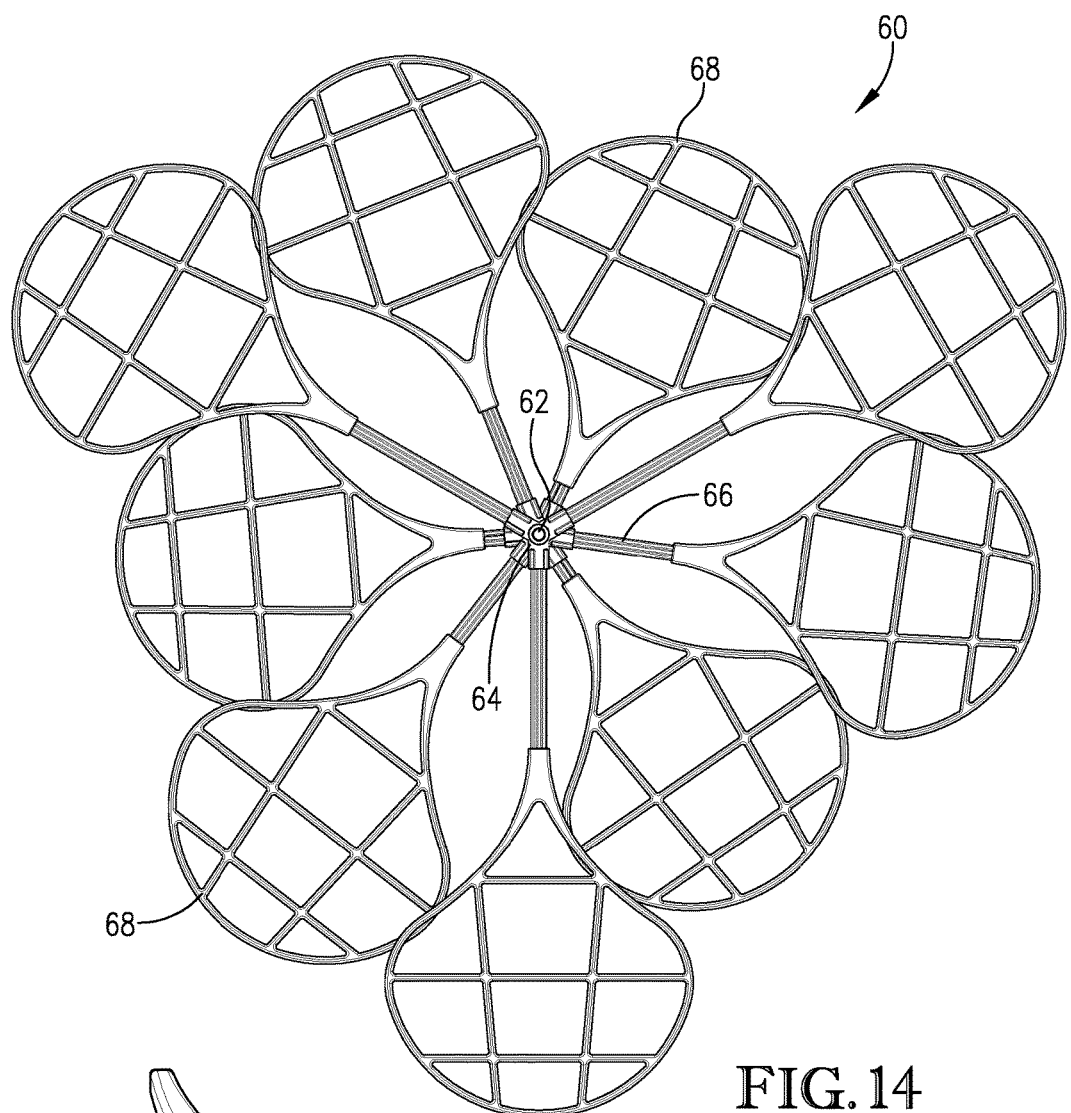
FIG. 14 is a top plan view of the plant support system from FIG. 13.
Figure 15:
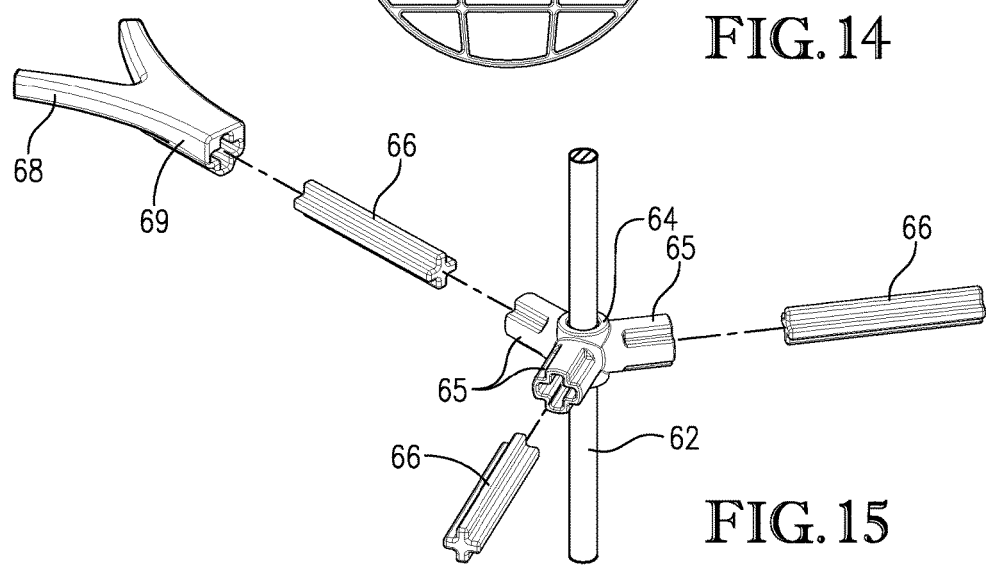
FIG. 15 is a partial exploded view of the plant support system from FIGS. 13 and 14, particularly illustrating a hub received on a main support beam, a plurality of support arms engaged with the hub, and a portion of a paddle engaged with one of the support beams.

In addition to the embodiments described above, FIGS. 13-21 illustrated additional embodiments of the present invention. Specifically, FIGS. 13-15 illustrated a plant support system 60 that is similar to the plant support system 10 shown in FIG. 1, except that a main support beam 62 of the plant support system 60 has a circular cross-section. In some embodiments, the main support beam 62 may have a threaded exterior such that a plurality of hubs 64 may be threadedly received along a length of the main support beam 62. As perhaps best shown in FIG. 15, the hubs 64 may be similar to the hubs 14 described above with respect to plant support system 10, except that protrusions 65 of the hubs 64 may be formed as hollow female connectors, so as to receive solid support arms 66. In addition, the protrusions 65 and the support arms 66 of the plant support system 60 may have a cross-shaped cross-section. Similarly, the paddles 68 of the plant support system 60 may include protrusions 69 formed as hollow female connectors, so as to receive the solid support arms 66. In contrast to the paddles 18 described above with respect to the plant support system 10, the paddles 68 may be formed with a closed frame without a connection mechanism for allowing the frame to be opened. In addition, webbing of the paddles 68 form closed-shapes (e.g., rectangles, triangles, etc.).

In operation, the plant support system 60 may be assembled and disassembled in a manner similar to that described above with respect to plant support system 10. However, because each of the paddles 68 are formed with a closed frame and with a webbing that forms a closed shapes, the paddles 68 may require that branches of the plant be threaded or weaved through the paddles 68 when assembling the plant support system 60. Similarly, when disassembling the plant support system 60, the plant branches may need to be un-threaded or un-weaved through the paddles 68. However, in some embodiments, the paddles 68 may be removed from a plant it is supporting by making one or more breaks, snaps, and/or cuts on the frame and/or on the webbing of the paddles 68.

Figure 16:
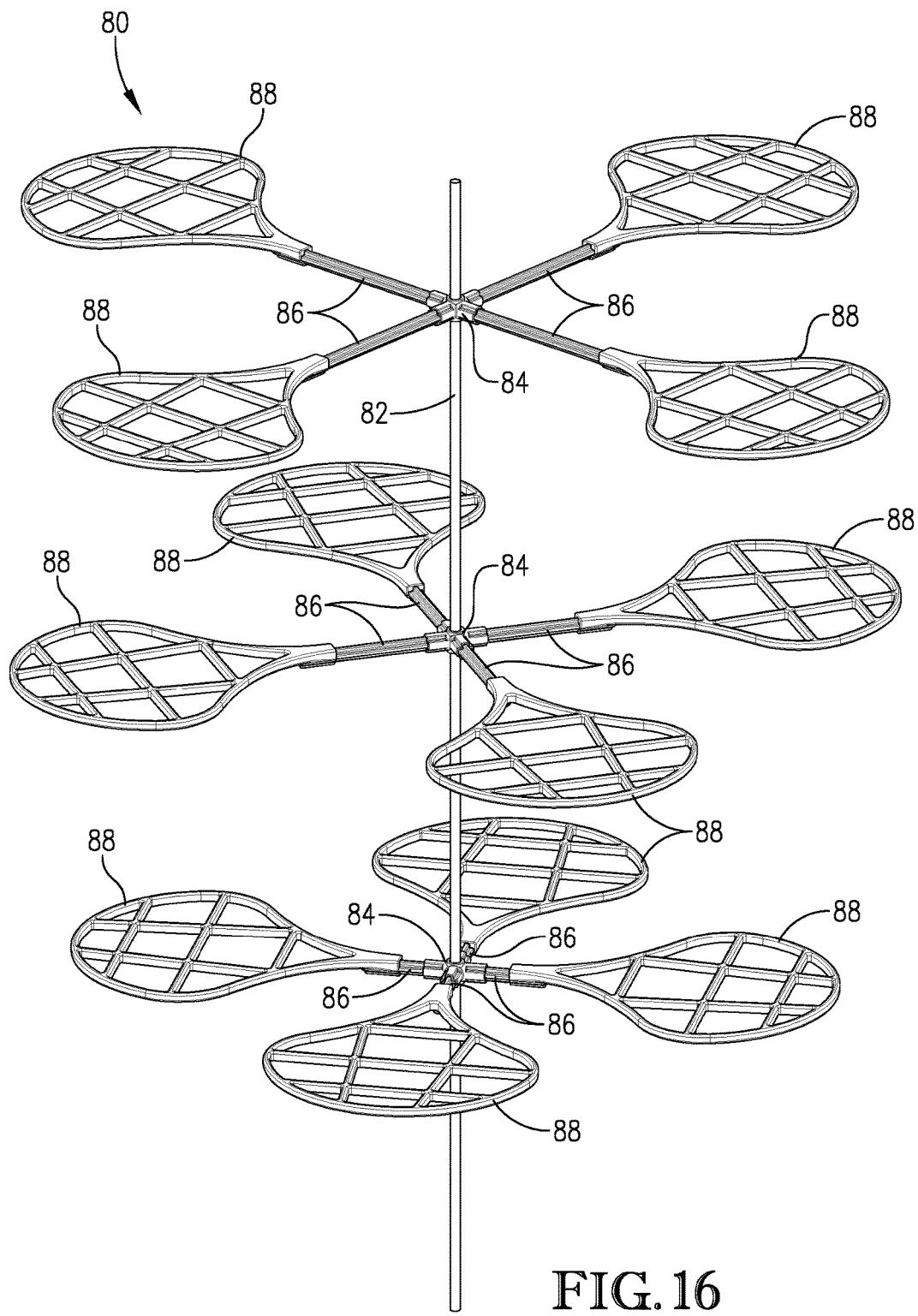
FIG. 16 is a perspective view of a further embodiment of a plant support system according to embodiments of the present invention.
Figure 17:
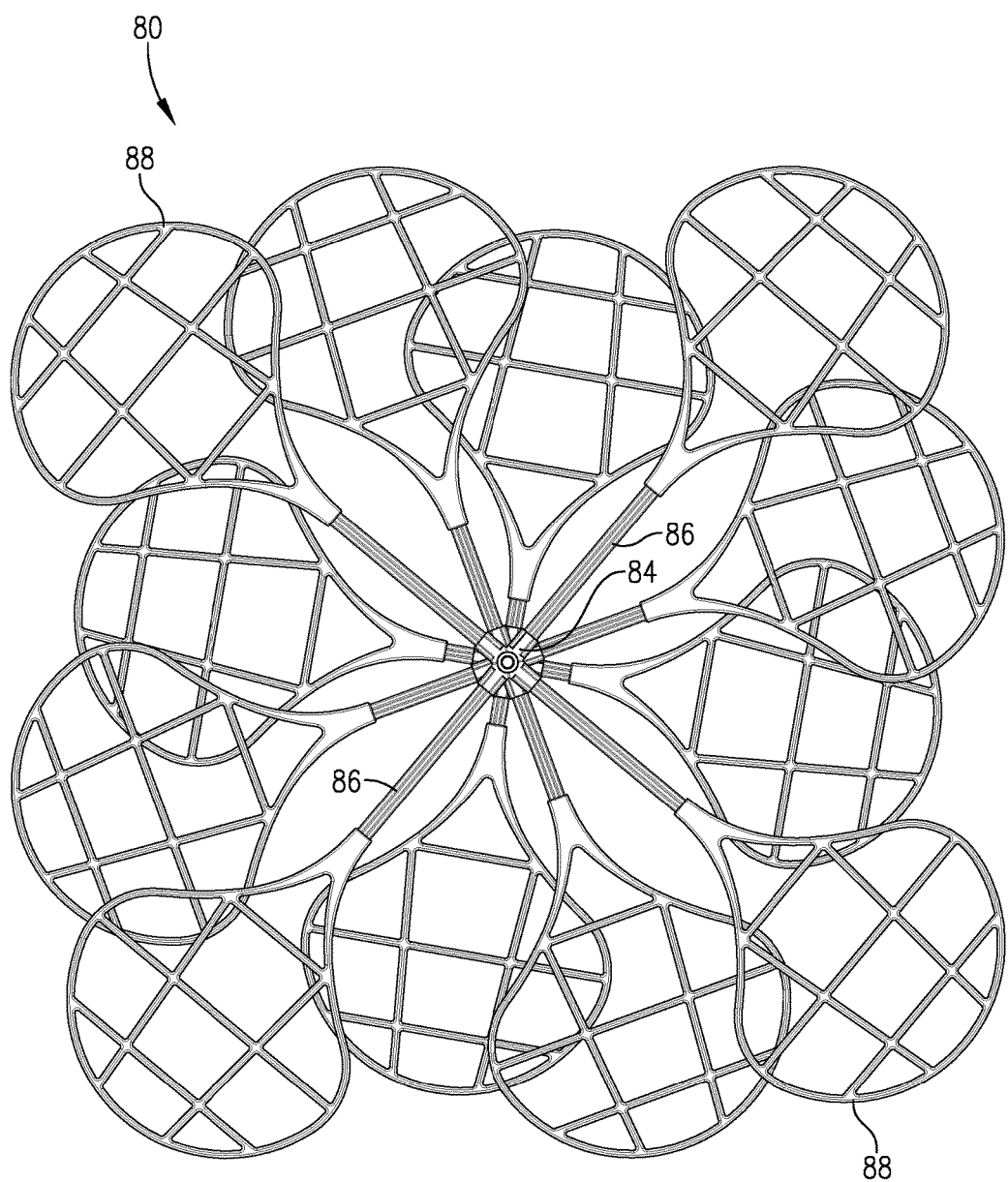
FIG. 17 is a top plan view of the plant support system from FIG. 16.

Turning to FIGS. 16 and 17, the drawings illustrate a plant support system 80 that is similar to plant support system 60, except that the plant support system 80 includes hubs 84 each engaged with four support arms 86, which are themselves engaged with four paddles 88. Specifically, each of the hubs 84 of the plant support system 80 may include four protrusions, each for connecting with a support arm 86. As described previously, each support arm 86 can further be engaged with a paddle 88, such that each hub 84 is associated with four paddles 88.

Figure 18:
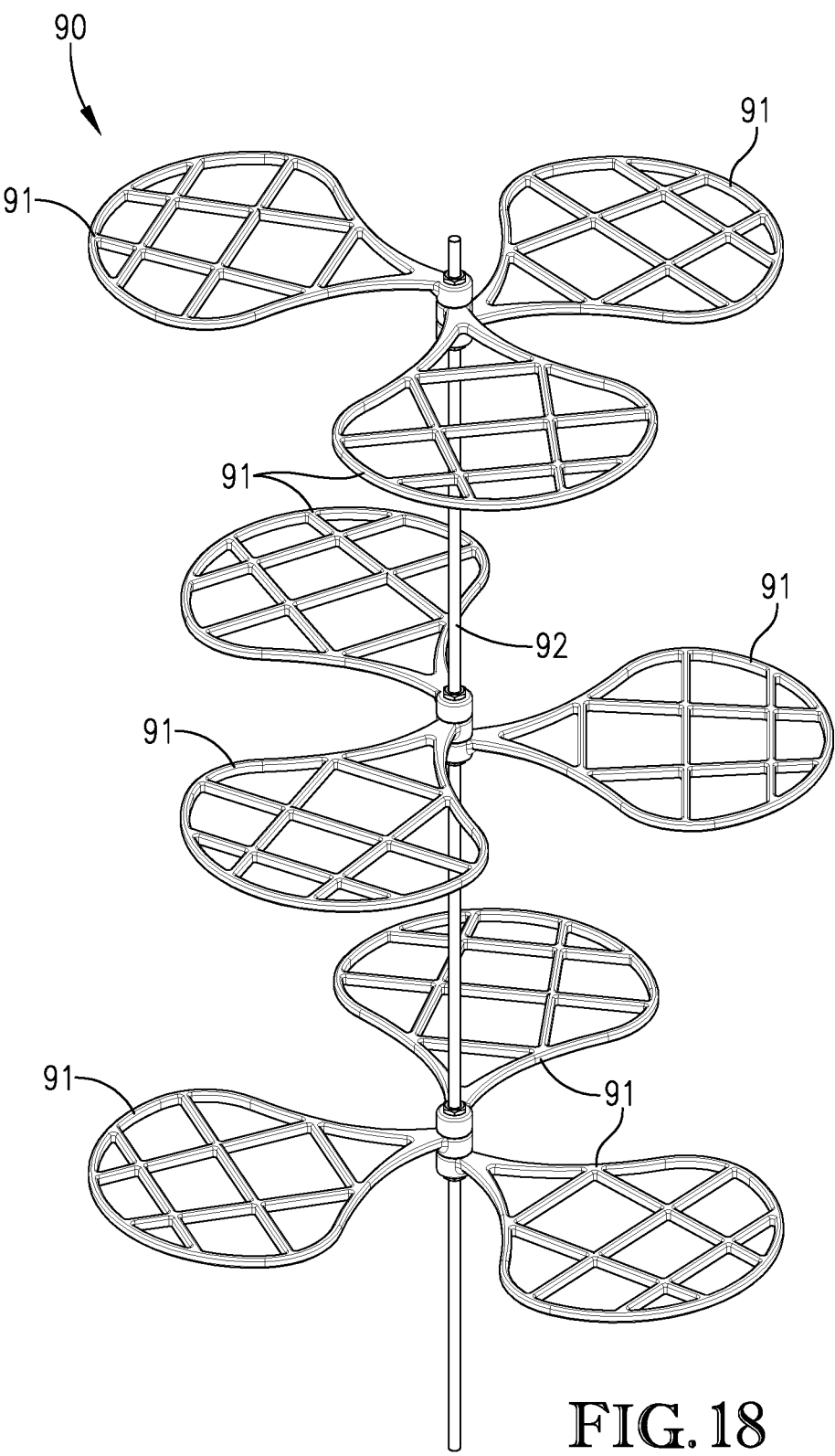
FIG. 18 is a perspective view of an even further embodiment of a plant support system according to embodiments of the present invention.
Figure 19:
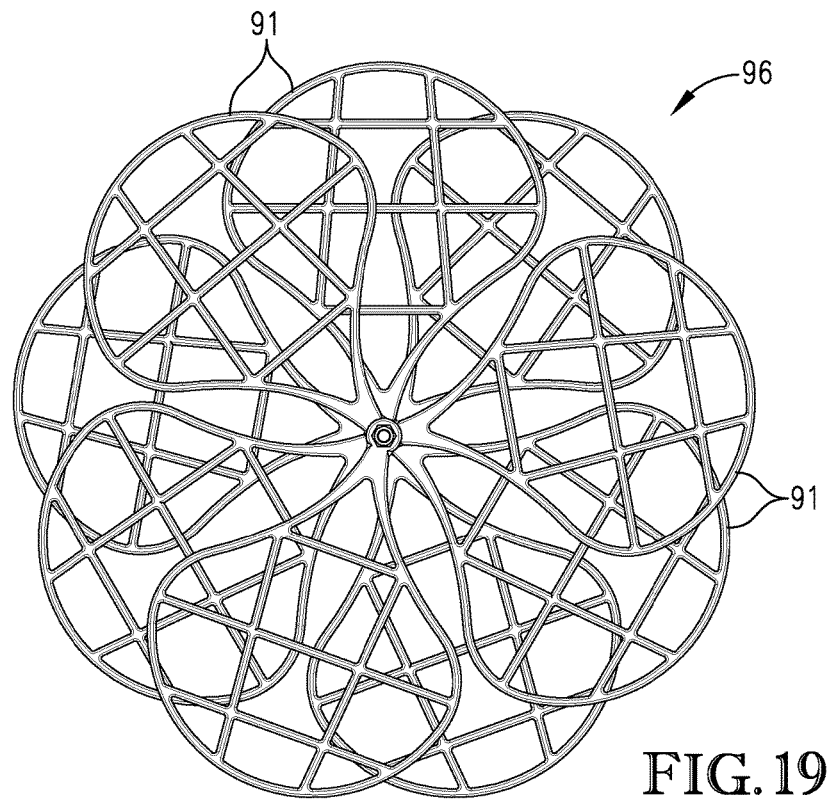
FIG. 19 is a top plan view of the plant support system from FIG. 18.

FIGS. 18 and 19 illustrate embodiments of the present invention that include a plant support system 90 that comprises a plurality of paddle combination assemblies 91. Specifically, each of the paddle combination assemblies 91 comprises a hub, a support arm, and a paddle combined together as an integral unit. As such, when the plant support system 90 is assembled and dis-assembled, each of the paddle combination assemblies 91 are received on the main support beam 92 as single unit.

Figure 21:
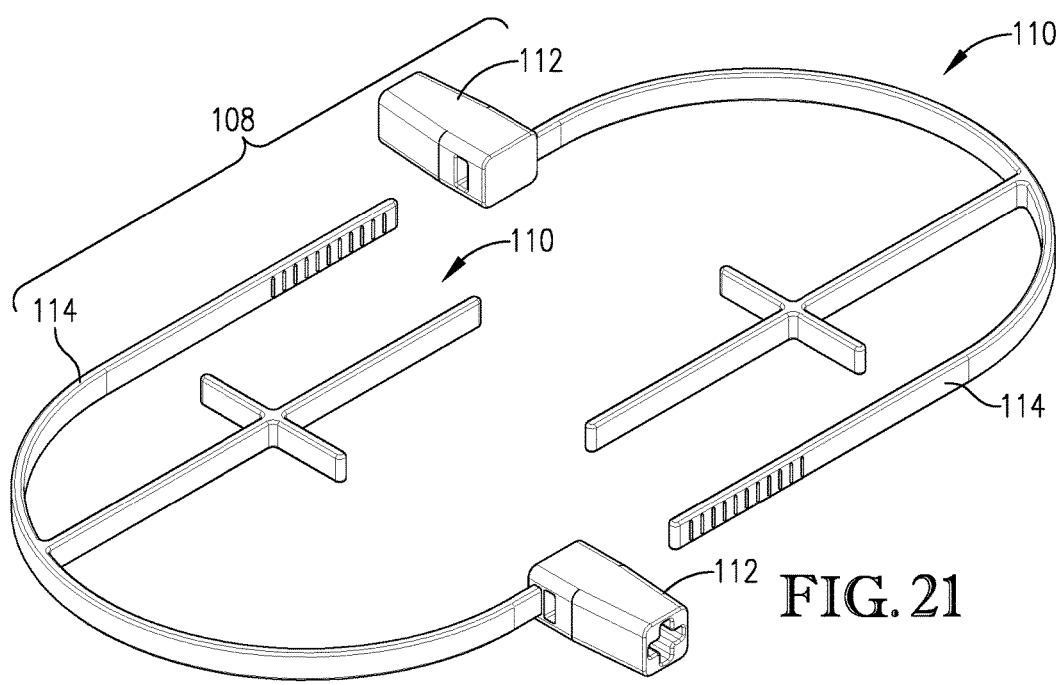
FIG. 21 is an exploded view of a paddle from the plant support system from FIG. 20, particularly illustrating the paddle comprising a pair of interconnectable cable-tie mechanisms.
Figure 20:
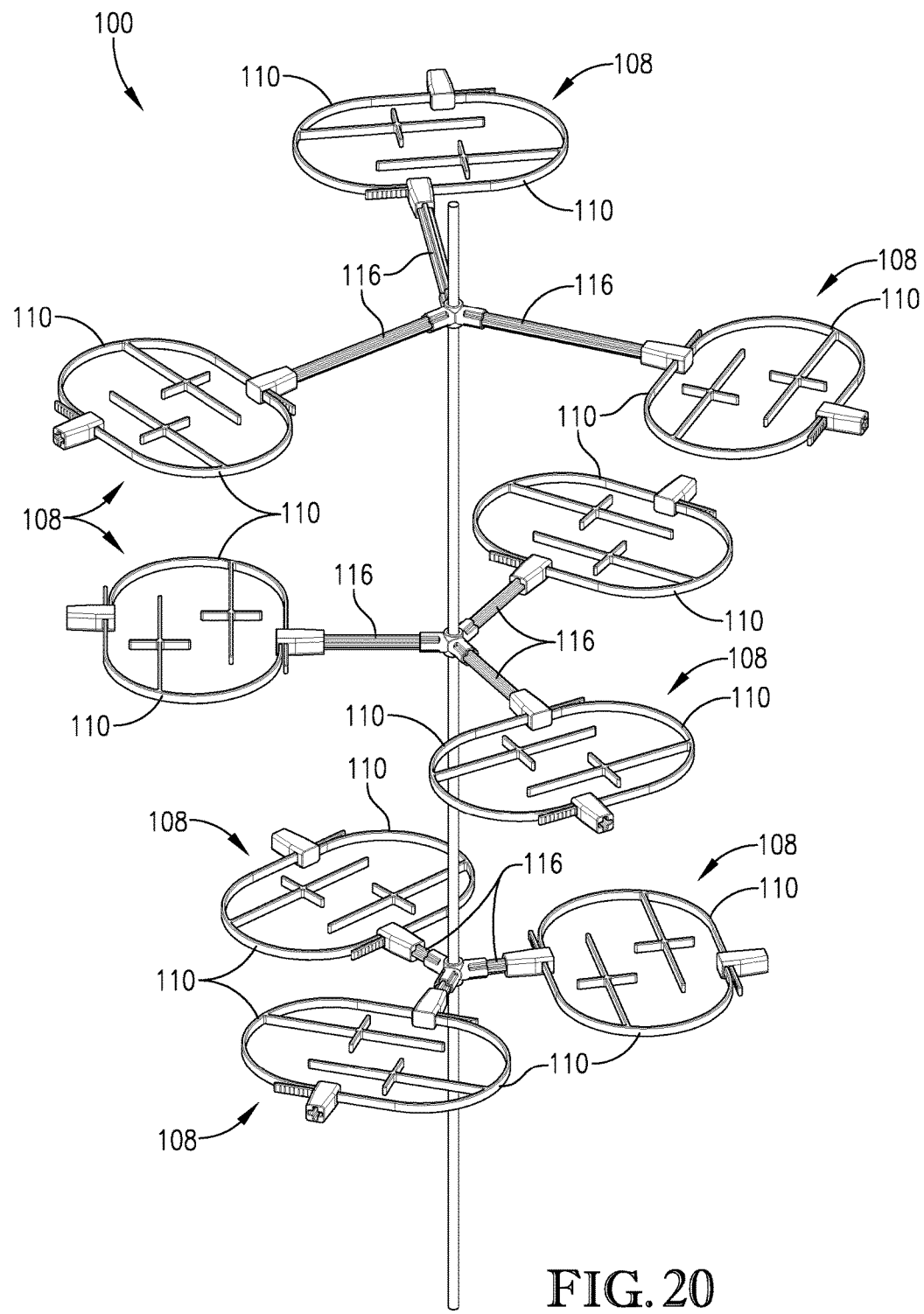
FIG. 20 is a perspective view of a still further embodiment of a plant support system according to embodiments of the present invention.

Finally, turning to FIGS. 20-21, an additional plant support system 100 is illustrated. The plant support system 100 is similar to the plant support system 60 previously described, except that paddles 108 of the plant support system 100 is comprised of two or more adjustable cable-tie mechanisms 110 that facilitate the assembly of each of the paddles 108 in a plurality of different sizes. In more detail, and with reference to FIG. 21, each of the cable-tie mechanisms 110 may comprise a protrusion 112 and a flexible tape section 114 that extends from the protrusion 112. As with the protrusions 69, the protrusions 112 may be formed as hollow female connectors, so as to receive the support arms 116 of the plant support system 100. In addition however, the protrusion 112 may include an opening with a pawl located therein. The tape section may 114 may be formed with a number of teeth, so as to present a gear rack. As such, the tape section 114 of a first cable-tie mechanism 110 may be inserted within the opening of the protrusion 112 of a second cable-tie mechanisms 110, such that that the teeth on the tape section 114 engage with the pawl on the protrusion 112 to secure the two cable-tie mechanisms 110 together in the form of a ratchet connection.

As such, to configure paddles 108 as shown in FIG. 20, two cable-tie mechanisms 110 may be used. Specifically, the protrusion 112 of a first cable-tie mechanism 110 may be engaged with a support arm 116. Next, the tape section 114 of the first cable-tie mechanisms 110 may be inserted within and engaged with a protrusion 112 of a second cable-tie mechanisms 110. Similarly, the tape section 114 of the second cable-tie mechanisms 110 may be inserted within and engaged with the protrusion of the first cable-tie mechanisms 110. As such, the cable-tie mechanisms 110 may be securely engaged together to form the paddle 108. Beneficially, the size of the paddle 108 can be efficiently set and/or adjusted by inserting each of the tape sections 114 a specific distance through the opposite protrusion 112. For example, by inserting the tape sections 114 further through the protrusions, the paddles 108 can be formed to have an increasingly smaller size. Alternatively, the protrusions 112 of one of the cable-tie mechanisms 110 may be have a release component that allows for the tape section 114 engaged therein to be released, so as to form the paddles with an increasingly larger size. In addition, multiple cable-tie mechanisms 110 can be integrated together to form a paddle 108 of larger sizes, as may be needed.

As described above, the tape sections 114 act as a frames for the paddles 108. Beneficially, the integration of tape sections 114 with protrusions 112 is releasable (i.e., act a connection mechanism), such that the frame of the paddles 108 is not permanently closed, which facilitates the ability of the paddles 108 to be integrated with the branches of a plant, without necessitating weaving or threading the branches though the paddles. Similarly, as shown in FIGS. 20-21, the webbing of the paddles 108 may be configured so as not to form closes shapes, which also facilitates the ability of the paddles 108 to be integrated with the branches of a plant, without necessitating weaving or threading the branches though the paddles.

Although the invention has been described with reference to the particular embodiments, it is noted that equivalents may be employed and substitutions made herein without departing from the scope of the invention.

The invention claimed is:

1. A plant support system comprising:
a longitudinally-extending main support beam;
at least one hub received on said main support beam;
at least one support arm comprising a first end and a second end, with the first end of the support arm engaged with said hub, such that said support arm extends laterally from said hub; and
a paddle removably engaged with the second end of said support arm, wherein said paddle comprises a frame enclosing an interior space, and wherein said paddle is configured to receive a portion of a plant through the interior space,
wherein said paddle includes a plurality of protrusions extending exteriorly from a periphery of said frame, where said protrusions are configured to be engaged with the second end of said support arm in a manner that permits said paddle to be oriented in a plurality of different positions.

2. The plant support system according to claim 1, wherein at least a portion of said plant support system is formed from polymer.

3. The plant support system according to claim 1, wherein said paddle is configured to be orientated in a plurality of angular positions.

4. The plant support system according to claim 3, wherein said protrusions have a triangular cross section, such that said paddle is configured to be oriented in three different angular positions.

5. The plant support system according to claim 1, wherein at least a portion of said plant support system is formed by 3D printing.

6. The plant support system according to claim 1, wherein said paddle further includes a webbing comprised of one or more extension elements extending from said frame through a portion of the interior space.

7. The plant support system according to claim 6, wherein said webbing does not form a closed shape within the interior space of said paddle.

8. The plant support system according to claim 1, wherein said paddle includes a connection mechanism to selectively provide for said frame to form a closed shape and an open shape.

9. The plant support system according to claim 1, wherein said paddle is formed from at least two cable-tie mechanisms, with each cable tie mechanism comprising one of said protrusions, each protrusion including an opening with a pawl located therein, and with each cable-tie mechanism further comprising a tape section extending from the protrusion of the cable-tie mechanism, and including a plurality of teeth formed thereon, wherein the teeth on one of the tape sections is configured to engage with the pawl in one of the protrusions so as to form a ratchet connection.

10. The plant support system according to claim 1, wherein said plant support system includes at least three hubs received on said main support beam, with said hubs spread along a length of said main support beam to present a lower hub, an intermediate hub, and an upper hub.

11. The plant support system according to claim 10, wherein each of said lower hub, said intermediate hub, and said upper hub includes at least three protrusions, wherein each of said hubs is engaged with at least three support arms via said three protrusions.

12. The plant support system according to claim 11, wherein the support arms engaged with said lower hub have a shortest length, wherein the support arms engaged with said intermediate hub have an intermediate length, and wherein the support arms engaged with said upper hub have a longest length.

13. The plant support system according to claim 12, wherein each of said support arms is engaged with an individual paddle.

14. The plant support system according to claim 13, wherein said plant support system is formed as an inverted pyramid.

15. A plant support system comprising:
a longitudinally-extending main support beam;
at least one hub received on said main support beam;
at least one support arm extending laterally from said hub; and a paddle removably engaged with a free end of said support arm, wherein said paddle comprises a frame enclosing an interior space and a webbing extending through a portion of said interior space, wherein said paddle is configured to support branches of a plant via said frame and said webbing, wherein said paddle includes a plurality of protrusions extending exteriorly from a periphery of said frame, where said protrusions are configured to be engaged with the free end of said support arm in a manner that permits said paddle to be oriented in a plurality of different positions.

16. The plant support system according to claim 15, wherein said paddle is configured to be orientated in a plurality of angular positions.

17. The plant support system according to claim 15, wherein at least a portion of said plant support system is formed by 3D printing.

18. The plant support system according to claim 15, wherein said webbing does not form a closed shape within the interior space of said paddle.

19. A method for assembling a plant support system to support a plant, said method comprising the steps of:
(a) providing the plant support system comprising a longitudinally-extending main support beam, at least one hub configured to be received on the main support beam, at least one support arm configured to extend laterally from the hub, and a paddle configured to be removably engaged with the support arm, with the paddle comprising a frame enclosing an interior space, and wherein the paddle includes a plurality of protrusions extending exteriorly from a periphery of the frame, wherein the protrusions are configured to be engaged with the support arm in a manner that permits the paddle to be oriented in a plurality of different positions;
(b) engaging the main support beam within a ground surface, such that the main support beam is orientated generally vertically;
(c) positioning the hub on the main support beam;
(d) engaging a first end of the support arm with the hub, such that the hub extends laterally from the support beam; and
(e) engaging the paddle with a second end of the support arm, wherein upon said engaging of step (e) a portion of the plant can be received within the interior space of the paddle such that the portion of the plant can be supported by the paddle.

20. The method according to claim 19, wherein the frame of the paddle includes a connection mechanism configured to allow the frame to open to permit the portion of the plant to be received within the interior space of the paddle.

* * * * *